(12) United States Patent
Neumeier

(10) Patent No.: US 10,482,349 B2
(45) Date of Patent: *Nov. 19, 2019

(54) SYSTEMS AND METHODS FOR REDUCING DATA DENSITY IN LARGE DATASETS

(71) Applicant: INSCAPE DATA, INC., Irvine, CA (US)

(72) Inventor: Zeev Neumeier, Berkeley, CA (US)

(73) Assignee: INSCAPE DATA, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/210,796

(22) Filed: Dec. 5, 2018

(65) Prior Publication Data

US 2019/0188520 A1 Jun. 20, 2019

Related U.S. Application Data

(63) Continuation of application No. 15/099,842, filed on Apr. 15, 2016, now Pat. No. 10,192,138.

(Continued)

(51) Int. Cl.
*G06K 9/48* (2006.01)
*G06K 9/52* (2006.01)
(Continued)

(52) U.S. Cl.
CPC ............ *G06K 9/52* (2013.01); *G06F 16/786* (2019.01); *G06K 9/00288* (2013.01);
(Continued)

(58) Field of Classification Search
CPC .. G06K 9/52; G06K 9/00288; G06K 9/00711; G06K 9/00751; G06K 9/627; G06K 9/6202; G06F 16/786
See application file for complete search history.

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

International Search Report and Written Opinion dated Mar. 31, 2015 for PCT Application No. PCT/US2014/072255, 8 pages.

(Continued)

*Primary Examiner* — Gregory M Desire
(74) *Attorney, Agent, or Firm* — Polsinelli LLP

(57) ABSTRACT

Techniques and systems are provided for identifying unknown content. For example, a number of vectors out of a plurality of vectors projected from an origin point can be determined that are between a reference data point and an unknown data point. The number of vectors can be used to estimate an angle between a first vector (from the origin point to a reference data point) and a second vector (from the origin point to an unknown data point). A distance between the reference data point and the unknown data point can then be determined. Using the determined distance, candidate data points can be determined from a set of reference data points. The candidate data points can be analyzed to identify the unknown data point.

20 Claims, 27 Drawing Sheets

Related U.S. Application Data

(60) Provisional application No. 62/149,193, filed on Apr. 17, 2015.

(51) Int. Cl.
*G06K 9/00* (2006.01)
*G06K 9/62* (2006.01)
*G06F 16/783* (2019.01)

(52) U.S. Cl.
CPC ...... *G06K 9/00711* (2013.01); *G06K 9/00751* (2013.01); *G06K 9/627* (2013.01); *G06K 9/6202* (2013.01)

(56) References Cited

U.S. PATENT DOCUMENTS

| | | |
|---|---|---|
| 4,739,398 A | 4/1988 | Thomas et al. |
| 5,019,899 A | 5/1991 | Boles et al. |
| 5,193,001 A | 3/1993 | Kerdranvrat |
| 5,210,820 A | 5/1993 | Kenyon |
| 5,319,453 A | 6/1994 | Copriviza et al. |
| 5,436,653 A | 7/1995 | Ellis et al. |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,025,837 A | 2/2000 | Matthews, III et al. |
| 6,035,177 A | 3/2000 | Moses et al. |
| 6,064,764 A | 5/2000 | Bhaskaran et al. |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,098,959 B2 | 8/2006 | Mishima et al. |
| 7,136,875 B2 | 11/2006 | Anderson et al. |
| 7,178,106 B2 | 2/2007 | Lamkin et al. |
| 7,210,157 B2 | 4/2007 | Devara |
| 7,346,512 B2 | 3/2008 | Wang et al. |
| 7,356,830 B1 | 4/2008 | Dimitrova |
| 7,421,723 B2 | 9/2008 | Harkness et al. |
| 7,545,984 B1 | 6/2009 | Kiel et al. |
| 7,590,998 B2 | 9/2009 | Hanley |
| 7,623,823 B2 | 11/2009 | Zito et al. |
| 7,787,696 B2 | 8/2010 | Wilhelm et al. |
| 7,793,318 B2 | 9/2010 | Deng |
| 7,933,451 B2 | 4/2011 | Kloer |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,352,535 B2 * | 1/2013 | Peled ............ G06F 21/10 709/200 |
| 8,364,703 B2 | 1/2013 | Ramanathan et al. |
| 8,385,644 B2 | 2/2013 | Stojancic et al. |
| 8,392,789 B2 | 3/2013 | Biscondi et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,619,877 B2 | 12/2013 | McDowell |
| 8,625,902 B2 | 1/2014 | Baheti et al. |
| 8,769,854 B1 | 7/2014 | Battaglia |
| 8,776,105 B2 | 7/2014 | Sinha et al. |
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,094,714 B2 | 7/2015 | Neumeier et al. |
| 9,094,715 B2 | 7/2015 | Neumeier et al. |
| 9,262,671 B2 | 2/2016 | Unzueta |
| 9,368,021 B2 | 6/2016 | Touloumtzis |
| 9,449,090 B2 | 9/2016 | Neumeier et al. |
| 9,465,867 B2 | 10/2016 | Hoarty |
| 9,838,753 B2 | 12/2017 | Neumeier et al. |
| 9,955,192 B2 | 4/2018 | Neumeier et al. |
| 10,080,062 B2 | 9/2018 | Neumeier et al. |
| 10,116,972 B2 | 10/2018 | Neumeier et al. |
| 10,169,455 B2 | 1/2019 | Neumeier et al. |
| 10,185,768 B2 | 1/2019 | Neumeier et al. |
| 10,192,138 B2 * | 1/2019 | Neumeier ............ G06F 16/786 |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054069 A1 | 5/2002 | Britt et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0078144 A1 | 6/2002 | Lamkin et al. |
| 2002/0083060 A1 | 6/2002 | Wang et al. |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0105794 A1 | 6/2003 | Jasinschi |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0188321 A1 | 10/2003 | Shoff et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |

(56) References Cited

U.S. PATENT DOCUMENTS

| | | |
|---|---|---|
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0242880 A1* | 10/2007 | Stebbings ............... G06F 21/10 382/172 |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0263620 A1 | 10/2008 | Berkvens et al. |
| 2008/0276266 A1 | 11/2008 | Huchital et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0083299 A1 | 4/2010 | Nelson |
| 2010/0115543 A1 | 5/2010 | Falcon |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0123165 A1 | 5/2014 | Mukherjee et al. |
| 2014/0130092 A1 | 5/2014 | Kunisetty |
| 2014/0188487 A1 | 7/2014 | Gonzalez |
| 2014/0193027 A1 | 7/2014 | Scherf |
| 2014/0195548 A1 | 7/2014 | Harron |
| 2014/0201769 A1 | 7/2014 | Neumeier et al. |
| 2014/0201772 A1 | 7/2014 | Neumeier et al. |
| 2014/0201787 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |
| 2015/0026728 A1 | 1/2015 | Carter et al. |
| 2015/0040074 A1 | 2/2015 | Hofmann et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1 | 4/2015 | Zhang et al. |
| 2015/0128161 A1 | 5/2015 | Conrad et al. |
| 2015/0163545 A1 | 6/2015 | Freed et al. |
| 2015/0181311 A1 | 6/2015 | Navin et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |

(56) References Cited

U.S. PATENT DOCUMENTS

| | | | |
|---|---|---|---|
| 2017/0134770 | A9 | 5/2017 | Neumeier et al. |
| 2017/0186042 | A1 | 6/2017 | Wong et al. |
| 2017/0311014 | A1 | 10/2017 | Fleischman |
| 2017/0353776 | A1 | 12/2017 | Holden et al. |

FOREIGN PATENT DOCUMENTS

| | | | |
|---|---|---|---|
| CN | 101162470 | | 4/2008 |
| CN | 1681304 | | 7/2010 |
| CN | 102377960 | | 3/2012 |
| CN | 101681373 | | 9/2012 |
| EP | 248 533 | | 8/1994 |
| EP | 1578126 | | 9/2005 |
| EP | 1 760 693 | A1 | 3/2007 |
| EP | 1504445 | B1 | 8/2008 |
| EP | 2 084 624 | | 8/2009 |
| EP | 2 352 289 | | 8/2011 |
| EP | 2 541 963 | A2 | 1/2013 |
| EP | 2 685 450 | A1 | 1/2014 |
| GB | 2457694 | | 8/2009 |
| WO | 0144992 | | 6/2001 |
| WO | 2005/101998 | | 11/2005 |
| WO | 2007/114796 | | 10/2007 |
| WO | 2008/065340 | | 6/2008 |
| WO | 2009/131861 | | 10/2009 |
| WO | 2009/150425 | | 12/2009 |
| WO | 2010/135082 | | 11/2010 |
| WO | 2011/090540 | A2 | 7/2011 |
| WO | 2012/057724 | | 5/2012 |
| WO | 2012/108975 | | 8/2012 |
| WO | 2012/170451 | | 12/2012 |
| WO | 2014/142758 | | 9/2014 |
| WO | 2014/145929 | A1 | 9/2014 |
| WO | 2015/100372 | A1 | 7/2015 |
| WO | 2016/123495 | | 8/2016 |
| WO | 2016/168556 | | 10/2016 |
| WO | 2017/011758 | | 1/2017 |
| WO | 2017/011792 | | 1/2017 |

OTHER PUBLICATIONS

International Search Report and Written Opinion dated Apr. 26, 2016 for PCT Application No. PCT/US2016/015681, 13 pages.
"How to: Watch from the beginning | About DISH" (Dec. 31, 2014) XP055265764, retrieved on Apr. 15, 2016 from URL:http://about.dish.com/blog/hopper/how-watch-beginning 2 pages.
International Search Report and Written Opinion dated Jun. 24, 2016 for PCT Application No. PCT/US2016/027691, 13 pages.
Gionis et al., "Similarity Search in High Dimension via Hashing", Proceedings of the 25th VLDB Conference, 1999, 12 pages.
Huang, "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.
Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion dated Oct. 12, 2016 for PCT Application No. PCT/US2016/042522,13 pages.
International Search Report and Written Opinion dated Oct. 11, 2016 for PCT Application No. PCT/US2016/042621, 13 pages.
International Search Report and Written Opinion dated Oct. 20, 2016 for PCT Application No. PCT/US2016/042611,12 pages.
Scouarnec et al., "Cache policies for cloud-based systems:To keep or not to keep", 2014 IEEE 7th International Conference on Cloud Computing, IEEE XP032696624, Jun. 27, 2014, pp. 1-8.
International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache(computing) &oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding Via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-9 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
U.S. Appl. No. 14/551,933, "Final Office Action", dated May 23, 2016, 19 pages.
U.S. Appl. No. 14/551,933 , "Non-Final Office Action", dated Oct. 17, 2016, 15 pages.
U.S. Appl. No. 14/551,933 , "Non-Final Office Action", dated Dec. 31, 2015, 24 pages.
U.S. Appl. No. 14/551,933 , "Notice of Allowance", dated Mar. 21, 2017, 8 pages.
U.S. Appl. No. 14/217,039 , "Non-Final Office Action", datd May 23, 2014, 27 pages.
U.S. Appl. No. 14/217,039 , "Final Office Action", dated Nov. 7, 2014, 15 pages.
U.S. Appl. No. 14/217,039 , "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance", dated Feb. 20, 2015, 51 pages.
U.S. Appl. No. 14/217,094, "Notice of Allowance", dated Sep. 4, 2014, 30 pages.
U.S. Appl. No. 14/217,375, "Non-Final Office Action", dated Apr. 1, 2015, 39 pages.

(56) References Cited

OTHER PUBLICATIONS

U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099 , "First Action Interview Office Action Summary", dated May 9, 2017, 6 pages.
U.S. Appl. No. 15/011,099 , "First Action Interview Pilot Program Pre-Interview Communication", dated Feb. 28, 2017, 5 pages.
U.S. Appl. No. 12/788,721 , "Non-Final Office Action", dated Mar. 28, 2012, 15 Pages.
U.S. Appl. No. 12/788,721 , "Final Office Action", dated Aug. 15, 2012, 22 Pages.
U.S. Appl. No. 12/788,721 , "Notice of Allowance", dated Aug. 15, 2013, 16 Pages.
U.S. Appl. No. 14/763,158 , "Non-Final Office Action", dated Jun. 27, 2016, 16 Pages.
U.S. Appl. No. 14/763,158 , "Final Office Action", dated Sep. 7, 2016, 12 Pages.
U.S. Appl. No. 14/763,158 , "Notice of Allowance", dated Mar. 17, 2016, 8 Pages.
U.S. Appl. No. 14/807,849 , "Non-Final Office Action", Nov. 25, 2015, 12 Pages.
U.S. Appl. No. 14/807,849 , "Final Office Action", dated Apr. 19, 2016, 13 pages.
U.S. Appl. No. 14/807,849 , "Non-Final Office Action", dated Feb. 28, 2017, 10 Pages.
U.S. Appl. No. 14/089,003 , "Notice of Allowance", dated Jul. 30, 2014, 24 Pages.
U.S. Appl. No. 12/788,748 , "Non-Final Office Action", dated Jan. 10, 2013, 10 Pages.
U.S. Appl. No. 12/788,748 , "Final Office Action", dated Nov. 21, 2013, 13 Pages.
U.S. Appl. No. 12/788,748 , "Notice of Allowance", dated Mar. 6, 2014, 7 Pages.
U.S. Appl. No. 14/953,994 , "Non-Final Office Action", dated Mar. 3, 2016, 34 Pages.
U.S. Appl. No. 14/953,994 , "Final Office Action", dated Jun. 1, 2016, 36 Pages.
U.S. Appl. No. 14/953,994 , "Notice of Allowance", dated Aug. 31, 2016, 15 Pages.
U.S. Appl. No. 14/807,849 , "Final Office Action", dated Jun. 22, 2017, 10 pages.
U.S. Appl. No. 15/011,099 , "Final Office Action", dated Jul. 24, 2017, 22 pages.
U.S. Appl. No. 15/240,801 , "Non-Final Office Action", dated Aug. 11, 2017, 18 pages.
U.S. Appl. No. 15/240,815 , "Non-Final Office Action", dated Aug. 23, 2017, 15 pages.
U.S. Appl. No. 15/211,345 , "First Action Interview Pilot Program Pre-Interview Communication", dated Sep. 19, 2017, 8 pages.
U.S. Appl. No. 14/807,849 , "Notice of Allowance", dated Nov. 30, 2017, 9 Pages.
U.S. Appl. No. 15/240,801 , "Final Office Action", dated Dec. 22, 2017, 24 pages.
U.S. Appl. No. 15/011,099, "Non-Final Office Action", dated Jan. 22, 2018, 23 pages.
U.S. Appl. No. 15/240,815 , "Final Office Action", dated Mar. 2, 2018, 14 pages.
U.S. Appl. No. 15/211,345 , "Final Office Action", dated Mar. 2, 2018, 14 pages.
Extended European Search Report dated Mar. 22, 2018 for European Application No. 15865033.3, 10 pages.
U.S. Appl. No. 15/099,842 , "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.
U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848 , "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.

\* cited by examiner

SYSTEMS AND METHODS FOR REDUCING DATA DENSITY IN LARGE DATASETS

CROSS-REFERENCE TO RELATED APPLICATIONS

This application is a continuation of U.S. application Ser. No. 15/099,842, filed Apr. 15, 2016, which claims the benefit of U.S. Provisional Application No. 62/149,193, filed Apr. 17, 2015, both of which are incorporated herein by reference in their entirety for all purpose.

This application is related to U.S. patent application Ser. No. 12/788,748, filed May 27, 2010, U.S. patent application Ser. No. 12/788,721, filed May 27, 2010, U.S. patent application Ser. No. 14/089,003, filed Nov. 25, 2013, U.S. patent application Ser. No. 14/217,075, filed Mar. 17, 2014, U.S. patent application Ser. No. 14/217,039, filed Mar. 17, 2014, U.S. patent application Ser. No. 14/217,094, filed Mar. 17, 2014, U.S. patent application Ser. No. 14/217,375, filed Mar. 17, 2014, U.S. patent application Ser. No. 14/217,425, filed Mar. 17, 2014, U.S. patent application Ser. No. 14/217,435, filed Mar. 17, 2014, U.S. patent application Ser. No. 14/551,933, filed Nov. 24, 2014, and U.S. patent application Ser. No. 14/763,158, filed Dec. 23, 2014, all of which are hereby incorporated by reference in their entirety.

FIELD

The present disclosure relates generally to effectively identifying content while limiting the amount of data needed to identify the content. For example, various techniques and systems are provided for identifying content while reducing data density in large datasets.

BACKGROUND

Managing dense datasets provides significant challenges. For example, there are difficulties in storing, indexing, and managing large amounts of data that is required for certain systems to function. One area in which such problems arise includes systems that search for and identify a closest match between data using reference data stored in large datasets. Storage of the actual data points makes up much of the storage volume in a database.

SUMMARY

Certain aspects and features of the present disclosure relate to identifying unknown content. For example, a plurality of vectors can be projected from an origin point. A number of vectors out of the plurality of vectors can be determined that are between a reference data point and an unknown data point. The number of vectors can be used to estimate an angle between a first vector (from the origin point to a reference data point) and a second vector (from the origin point to an unknown data point). A distance between the reference data point and the unknown data point can then be determined. Using the determined distance, candidate data points can be determined from a set of reference data points. The candidate data points can be analyzed to identify the unknown data point.

The techniques described herein allow identification of unknown content, while reducing data density in large datasets. For example, systems and methods are described for improving the efficiency of storing and searching large datasets. The techniques can be applied to any system that harvests and manipulates large volumes of data. Such systems can include, for example, automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system.

In some examples, the techniques performed using the systems and methods described herein significantly reduce the amount of data that must be stored in order to search and find relationships between unknown and known data groups. For example, the amount of data that must be stored can be reduced by eliminating the need to store the actual known data points.

According to at least one example, a system is provided for identifying video content being displayed by a display. The system includes one or more processors. The system further includes a non-transitory machine-readable storage medium containing instructions which when executed on the one or more processors, cause the one or more processors to perform operations including: obtaining a plurality of reference video data points; determining a length of a first vector from an origin point to a reference video data point of the plurality of reference video data points; obtaining an unknown video data point associated with video content being presented by a display; determining a length of a second vector from the origin point to the unknown video data point; projecting a plurality of vectors from the origin point; determining a number of the plurality of vectors between the reference video data point and the unknown video data point; estimating an angle between the first vector and the second vector, wherein the angle is estimated using the number of the plurality of vectors; determining a distance between the reference video data point and the unknown video data point, wherein the distance is determined using the estimated angle and the determined lengths of the first vector and the second vector; identifying one or more candidate video data points from the plurality of reference video data points, wherein a candidate video data point is a candidate for matching the unknown video data point, and wherein the one or more candidate video data points are determined based on determined distances between one or more reference video data points and the unknown video data point; and identifying the video content being presented by the display, wherein the video content being presented by the display is identified by comparing the unknown video data point with the one or more candidate video data points.

In another example, a computer-implemented method is provided that includes: obtaining a plurality of reference video data points; determining a length of a first vector from an origin point to a reference video data point of the plurality of reference video data points; obtaining an unknown video data point associated with video content being presented by a display; determining a length of a second vector from the origin point to the unknown video data point; projecting a plurality of vectors from the origin point; determining a number of the plurality of vectors between the reference video data point and the unknown video data point; estimating an angle between the first vector and the second vector, wherein the angle is estimated using the number of the plurality of vectors; determining a distance between the reference video data point and the unknown video data point, wherein the distance is determined using the estimated angle and the determined lengths of the first vector and the second vector; identifying one or more candidate video data points from the plurality of reference video data points, wherein a candidate video data point is a candidate for matching the unknown video data point, and wherein the one or more candidate video data points are determined based on determined distances between one or more reference video data points and the unknown video data point; and identifying the video content being presented by the display, wherein the video content being presented by the display is identified by comparing the unknown video data point with the one or more candidate video data points.

In another example, a computer-program product tangibly embodied in a non-transitory machine-readable storage medium of a computing device may be provided. The computer-program product may include instructions configured to cause one or more data processors to: obtain a plurality of reference video data points; determine a length of a first vector from an origin point to a reference video data point of the plurality of reference video data points; obtain an unknown video data point associated with video content being presented by a display; determine a length of a second vector from the origin point to the unknown video data point; project a plurality of vectors from the origin point; determine a number of the plurality of vectors between the reference video data point and the unknown video data point; estimate an angle between the first vector and the second vector, wherein the angle is estimated using the number of the plurality of vectors; determine a distance between the reference video data point and the unknown video data point, wherein the distance is determined using the estimated angle and the determined lengths of the first vector and the second vector; identify one or more candidate video data points from the plurality of reference video data points, wherein a candidate video data point is a candidate for matching the unknown video data point, and wherein the one or more candidate video data points are determined based on determined distances between one or more reference video data points and the unknown video data point; and identify the video content being presented by the display, wherein the video content being presented by the display is identified by comparing the unknown video data point with the one or more candidate video data points.

In some embodiments, the plurality of reference video data points include video data extracted from one or more video frames.

In some embodiments, the plurality of projected vectors are pseudo-randomly generated.

In some embodiments, determining the number of the plurality of vectors between the reference video data point and the unknown video data point includes: determining whether each vector of the plurality of vectors is to an algebraic right or to an algebraic left of the first vector of the reference video data point; determining whether each vector of the plurality of vectors is to the algebraic right or to the algebraic left of the second vector of the unknown video data point; and determining the number of the plurality of vectors between the reference video data point and the unknown video data point, wherein the number of the plurality of vectors includes vectors to the algebraic left of the first vector and to the algebraic right of the second vector or vectors to the algebraic right of the first vector and to the algebraic left of the second vector.

In some embodiments, the reference video data point is discarded after the length of the first vector of the reference video data point is determined and after each vector of the plurality of vectors is determined to be to the algebraic right or to the algebraic left of the first vector.

In some embodiments, the method, system, and computer-program product described above for identifying video content further includes: storing a first binary value for each vector that is determined to be to the algebraic right of the first vector of the reference video data point; and storing a second binary value for each vector that is determined to be to the algebraic left of the first vector of the reference video data point.

In some embodiments, the method, system, and computer-program product described above for identifying video content further includes: storing a first binary value for each vector that is determined to be to the algebraic right of the second vector of the unknown video data point; and storing a second binary value for each vector that is determined to be to the algebraic left of the second vector of the unknown video data point.

In some embodiments, estimating the angle between the first vector of the reference video data point and the second vector of the unknown video data point includes multiplying a constant by a ratio, wherein the ratio includes the number of the plurality of vectors between the reference video data point and the unknown video data point divided by a total number of the plurality of vectors.

In some embodiments, determining the distance between the reference video data point and the unknown video data point includes performing a Pythagorean identity calculation using the estimated angle and the determined lengths of the first vector and the second vector.

In some embodiments, identifying the video content being presented by the display includes determining a match between the unknown video data point and a candidate video data point, wherein the match is an approximate match based on the candidate video data point being a closest video data point of the one or more candidate video data points to the unknown video data point.

According to at least one other example, a system of identifying one or more unknown data points may be provided that includes one or more processors. The system further includes a non-transitory machine-readable storage medium containing instructions which when executed on the one or more processors, cause the one or more processors to perform operations including: obtaining a plurality of reference data points; determining a length of a first vector from an origin point to a reference data point of the plurality of reference data points; obtaining an unknown data point; determining a length of a second vector from the origin point to the unknown data point; projecting a plurality of vectors from the origin point; determining a number of the plurality of vectors between the reference data point and the unknown data point; estimating an angle between the first vector and the second vector, wherein the angle is estimated using the number of the plurality of vectors; determining a distance between the reference data point and the unknown data point, wherein the distance is determined using the estimated angle and the determined lengths of the first vector and the second vector; and identifying one or more candidate data points from the plurality of reference data points, wherein a candidate data point is a candidate for matching the unknown data point, and wherein the one or more candidate data points are determined based on determined distances between one or more reference data points and the unknown data point.

In another example, a computer-implemented method is provided that includes: obtaining a plurality of reference data points; determining a length of a first vector from an origin point to a reference data point of the plurality of reference data points; obtaining an unknown data point; determining a length of a second vector from the origin point to the unknown data point; projecting a plurality of vectors from the origin point; determining a number of the plurality of vectors between the reference data point and the unknown data point; estimating an angle between the first vector and the second vector, wherein the angle is estimated using the number of the plurality of vectors; determining a distance between the reference data point and the unknown data point, wherein the distance is determined using the estimated angle and the determined lengths of the first vector and the second vector; and identifying one or more candidate data points from the plurality of reference data points, wherein a candidate data point is a candidate for matching the unknown data point, and wherein the one or more candidate data points are determined based on determined distances between one or more reference data points and the unknown data point.

In another example, a computer-program product tangibly embodied in a non-transitory machine-readable storage medium of a television system may be provided. The computer-program product may include instructions configured to cause one or more data processors to: obtain a plurality of reference data points; determine a length of a first vector from an origin point to a reference data point of the plurality of reference data points; obtain an unknown data point; determine a length of a second vector from the origin point to the unknown data point; project a plurality of vectors from the origin point; determine a number of the plurality of vectors between the reference data point and the unknown data point; estimate an angle between the first vector and the second vector, wherein the angle is estimated using the number of the plurality of vectors; determine a distance between the reference data point and the unknown data point, wherein the distance is determined using the estimated angle and the determined lengths of the first vector and the second vector; and identify one or more candidate data points from the plurality of reference data points, wherein a candidate data point is a candidate for matching the unknown data point, and wherein the one or more candidate data points are determined based on determined distances between one or more reference data points and the unknown data point.

In some embodiments, the method, system, and computer-program product described above for identifying one or more unknown data points includes determining a match between the unknown data point and a candidate data point, wherein the match is an approximate match based on the candidate data point being a closest data point of the one or more candidate data points to the unknown data point.

In some embodiments, the plurality of projected vectors are pseudo-randomly generated.

In some embodiments, determining the number of the plurality of vectors between the reference data point and the unknown data point includes: determining whether each vector of the plurality of vectors is to an algebraic right or to an algebraic left of the first vector of the reference data point; determining whether each vector of the plurality of vectors is to the algebraic right or to the algebraic left of the second vector of the unknown data point; and determining the number of the plurality of vectors between the reference data point and the unknown data point, wherein the number of the plurality of vectors includes vectors to the algebraic left of the first vector and to the algebraic right of the second vector or vectors to the algebraic right of the first vector and to the algebraic left of the second vector.

In some embodiments, the reference data point is discarded after the length of the first vector of the reference data point is determined and after each vector of the plurality of vectors is determined to be to the algebraic right or to the algebraic left of the first vector.

In some embodiments, the method, system, and computer-program product described above for identifying one or more unknown data points further includes: storing a first binary value for each vector that is determined to be to the algebraic right of the first vector of the reference data point; and storing a second binary value for each vector that is determined to be to the algebraic left of the first vector of the reference data point.

In some embodiments, the method, system, and computer-program product described above for identifying one or more unknown data points further includes: storing a first binary value for each vector that is determined to be to the algebraic right of the second vector of the unknown data point; and storing a second binary value for each vector that is determined to be to the algebraic left of the second vector of the unknown data point.

In some embodiments, estimating the angle between the first vector of the reference data point and the second vector of the unknown data point includes multiplying a constant by a ratio, wherein the ratio includes the number of the plurality of vectors between the reference data point and the unknown data point divided by a total number of the plurality of vectors.

In some embodiments, determining the distance between the reference data point and the unknown data point includes performing a Pythagorean identity calculation using the estimated angle and the determined lengths of the first vector and the second vector.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
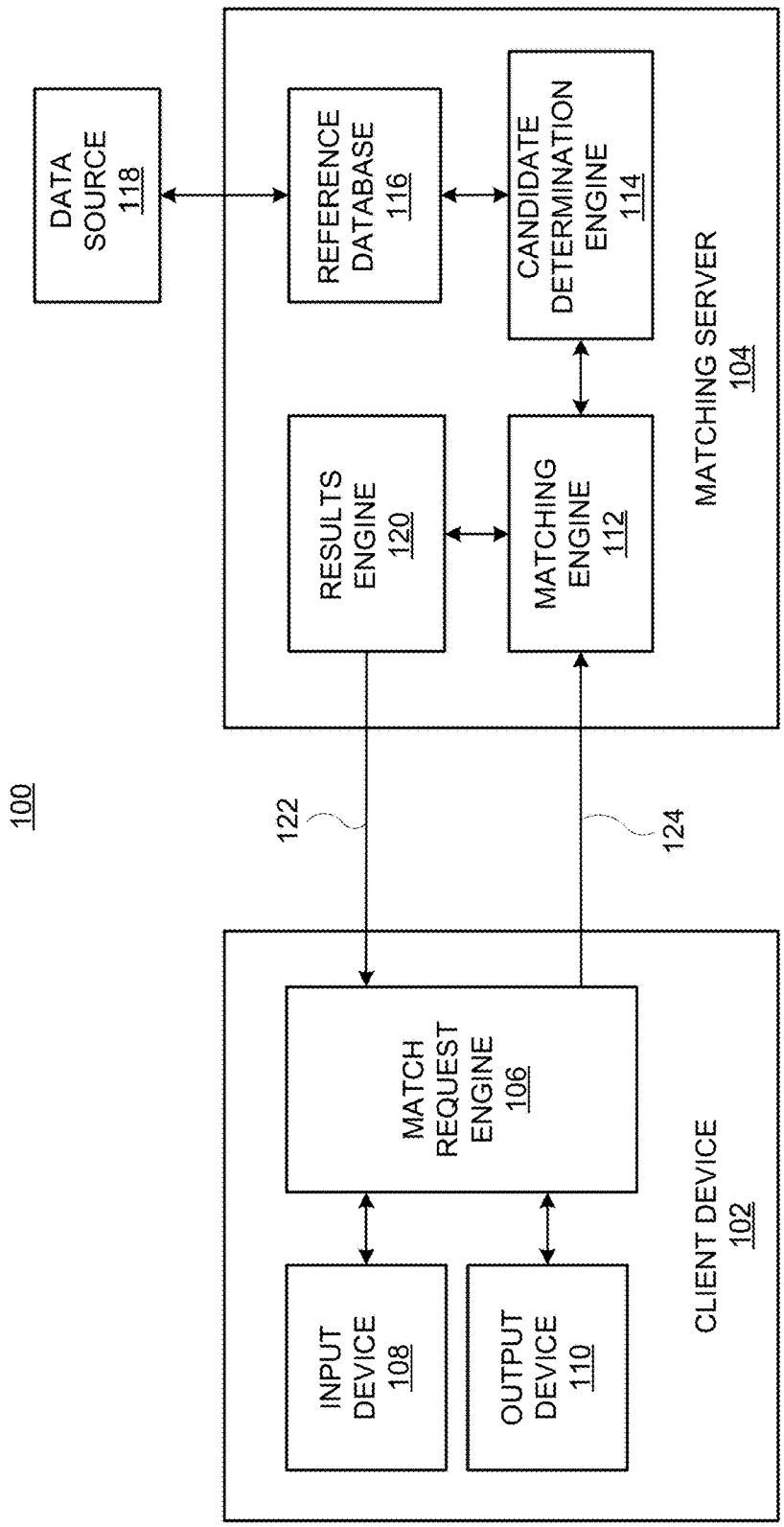
FIG. 1 is a block diagram of an example of a matching system.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

As described in further detail below, certain aspects and features of the present disclosure relate to identifying unknown data points by comparing the unknown data points to one or more reference data points. The systems and methods described herein improve the efficiency of storing and searching large datasets that are used to identify the unknown data points. For example, the systems and methods allow identification of the unknown data points while reducing the density of the large dataset required to perform the identification. The techniques can be applied to any system that harvests and manipulates large volumes of data. Illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data. In the context of automated content recognition (ACR), for example, the systems and methods reduce the amount of data that must be stored in order for a matching system to search and find relationships between unknown and known data groups.

By way of example only and without limitation, some examples described herein use an automated audio and/or video content recognition system for illustrative purposes. However, one of ordinary skill in the art will appreciate that the other systems can use the same techniques.

A significant challenge with ACR systems and other systems that use large volumes of data is managing the amount of data that is required for the system to function. Using a video-based ACR system as one example, one challenge includes attempting to identify a video segment being displayed by a television display in a home among many millions of homes. Another challenge includes the need to build and maintain a database of known video content to serve as a reference to match against. Building and maintaining such a database involves collecting and digesting a vast amount (e.g., hundreds, thousands, or more) of nationally distributed television programs and an even larger amount of local television broadcasts among many other potential content sources. The digesting can be performed using any available technique that reduces the raw data of video or audio into compressed, searchable data (e.g., tokens). With a 24-hour, seven-day-a-week operating schedule and a sliding window of perhaps two weeks of television programming to store, the data volume required to perform ACR builds rapidly. Similar challenges are present with other systems that harvest and manipulate large volumes of data, such as the example systems described above.

The systems and methods described herein allow identification of unknown data points with further reduced datasets than those required using conventional techniques. For example, the amount of data needed to be generated, stored, and compared to search and find relationships between unknown and known data groups is vastly reduced (e.g., by approximately an order of magnitude or other amount depending on the type of system), providing a more efficient technique for storing and indexing the data.

FIG. 1 illustrates a matching system 100 that can identify unknown content. For example, the matching system 100 can match unknown data points with reference data points to identify the unknown data points. The matching system 100 includes a client device 102 and a matching server 104. The client device includes a match request engine 106, an input device 108 and an output device 110. The input device 108 can include any suitable device that allows a request or other information to be input to the match request engine 106. For example, the input device 108 can include a keyboard, a mouse, a voice-recognition input device, a wireless interface for receiving wireless input from a wireless device (e.g., from a remote controller, a mobile device, or other suitable wireless device), or any other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The match request engine 106 can send a communication 124 to a matching engine 112 of the matching server 104. The communication 124 can include a request for the matching engine 112 to identify unknown content. The matching engine 112 can identify the unknown content by matching the content to reference data in a reference database 116. For example, the unknown content can include one or more unknown data points and the reference database 116 can include a plurality of reference data points. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the data source 118. For example, data points can be extracted from the information provided from the data source 118 and can be indexed and stored in the database 116.

The matching engine 112 can send a request to the candidate determination engine 114 to determine candidate data points from the reference database 116. The candidate data points are reference data points that are a certain determined distance from the unknown data point. The candidate determination engine 114 can return the candidate data points to the matching engine 112. Using the candidate data points, the matching engine 112 can determine a closest reference data point to the unknown data point. For example, as described in more detail below, a path pursuit algorithm can be used to identify the closest reference data point from the candidate data points.

Figure 2:
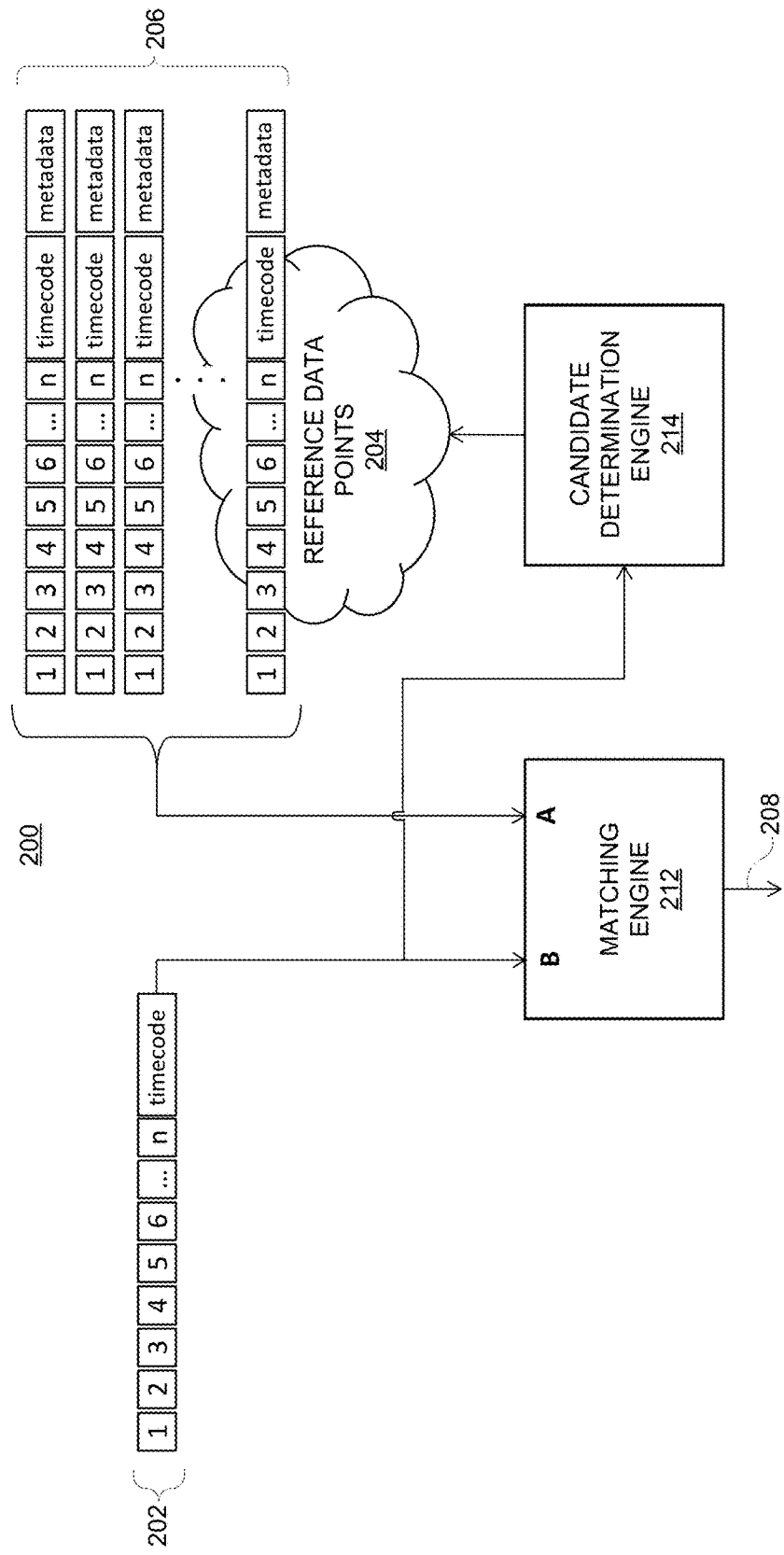
FIG. 2 is a block diagram showing an example of the matching system identifying unknown data points.

FIG. 2 illustrates components of a matching system 200 identifying unknown data points. For example, the matching engine 212 can perform a matching process for comparing unknown content (e.g., unknown media segments, a search query, an image of a face or a pattern, or the like) against a database of known content (e.g., known media segments, information stored in a database for searching against, known faces or patterns, or the like). For example, the matching engine 212 receives unknown data content 202 (which can be referred to as a "cue") to be identified using reference data points 204 in a reference database. The unknown data content 202 is also received by the candidate determination engine 214. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202. The unknown data content 202 and the candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

Figure 3:
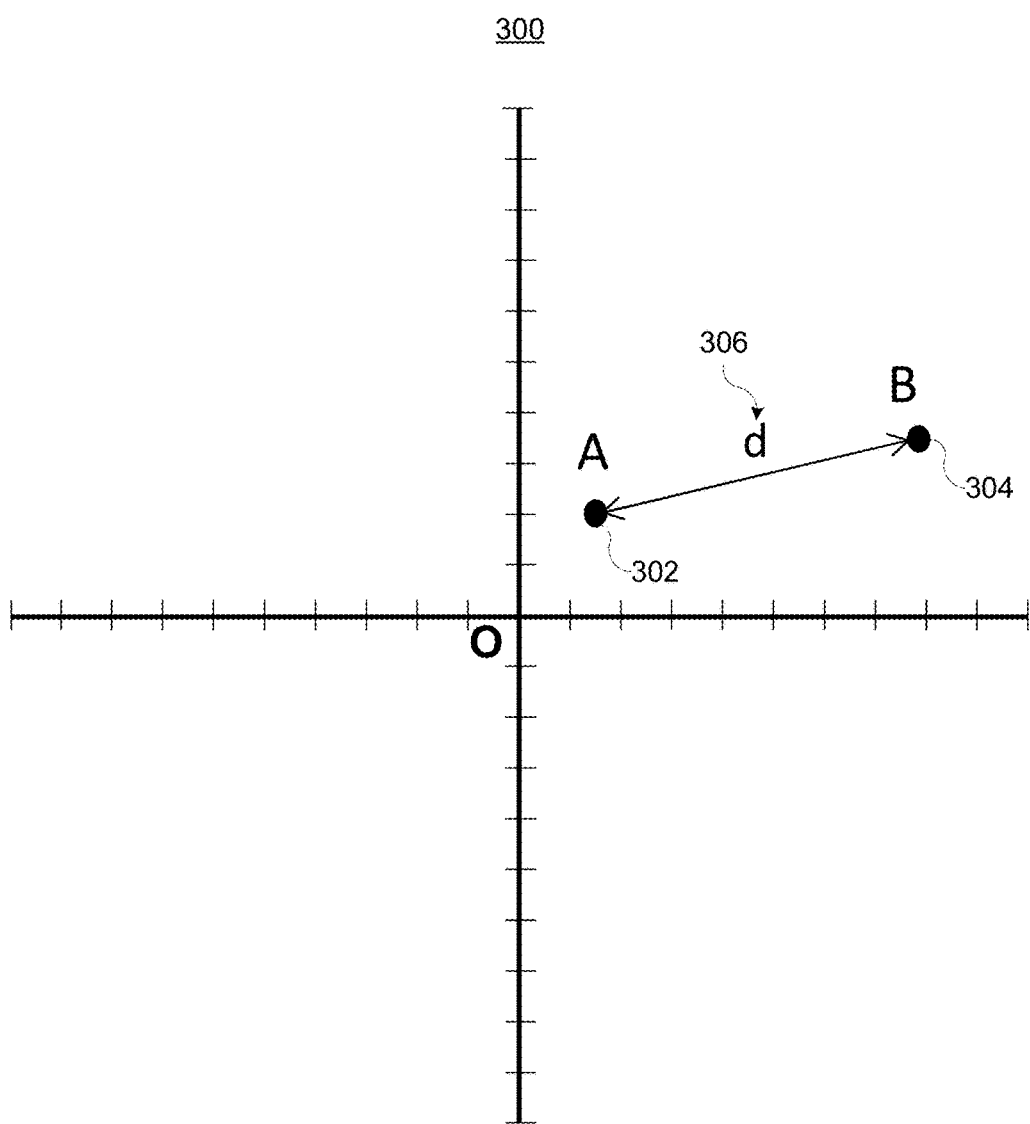
FIG. 3 is a diagram illustrating two data points and a vector distance between the two data points.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. FIG. 3 shows two data points, including data point A (shown as data point A 302)

and data point B (shown as data point B 304). Data point A 302 can be a reference data point and data point B 304 can be an unknown data point. The distance d 306 between data point A 302 and data point B 304 is also shown.

Some examples are described using two-dimensional vector space as an example, but are equally applicable to other vector space dimensions. For example, while the example shown in FIG. 3 and other figures are shown in two-dimensional space, the same techniques described herein can be applied in any number of dimensions. For instance, other vector dimensions include 1-dimensional, 3-dimensional, 26-dimensional, 75-dimensional, or any other vector space dimension.

Various techniques can be used to determine the distance between data points. For example, one technique of determining a distance between two points A and B, in N-dimensional space, is using the formula:

$$A\cdot A + B\cdot B - 2AB = d^2/2,$$

where A is a vector from an origin point (e.g., at point (0,0)) to point A and B is a vector from the origin point to point B. A·A is the dot product of vector A with itself and B·B is the dot product of vector B with itself. The result of A·A and B·B are scalar values.

Another technique of determining a distance between two data points A and B can include using the formula:

$$A\cdot A/2 + B\cdot B/2 - A\cdot B = d^2/2$$

Figure 4:
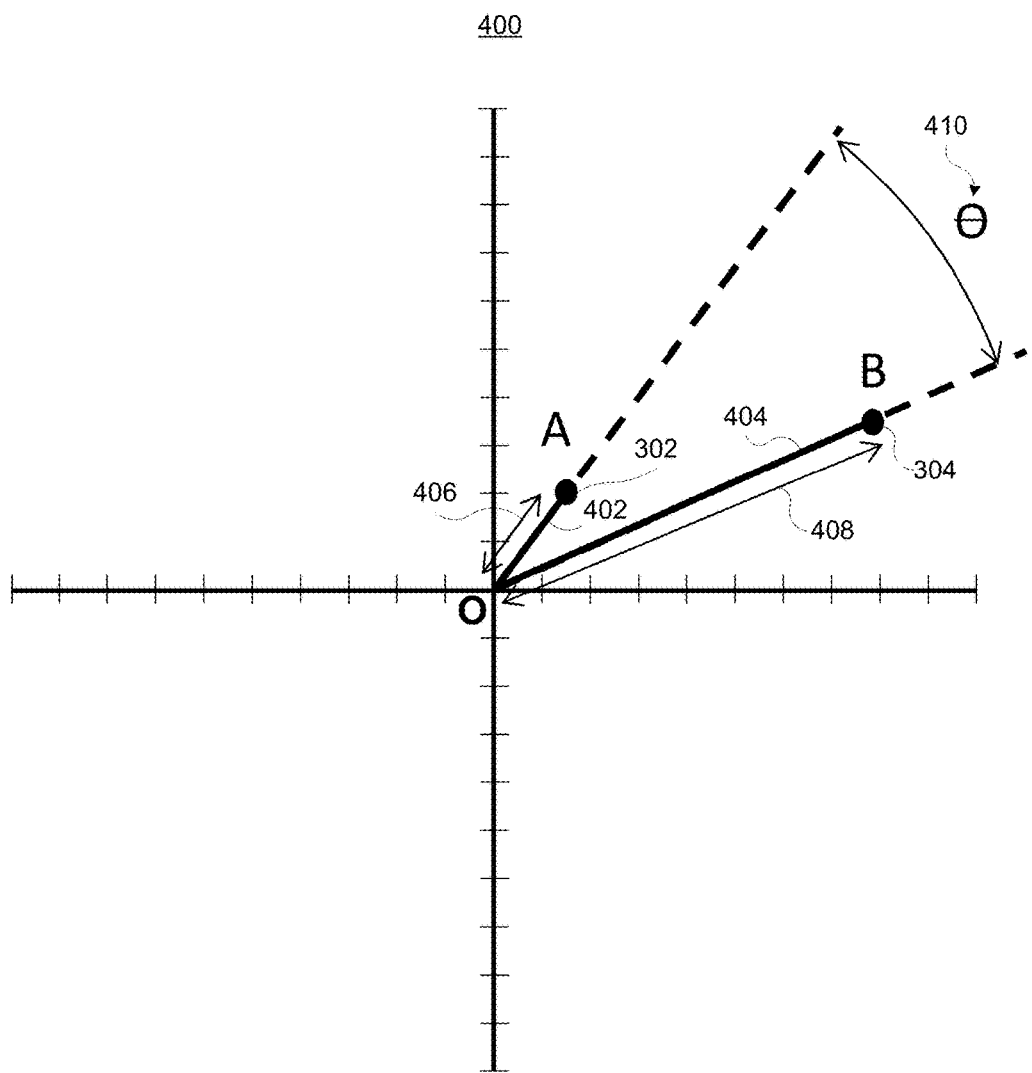
FIG. 4 is a diagram illustrating two vectors to two data points and an angle between the vectors.

Another technique for determining the distance between two or more data points can include using an angle between vectors passing through the data points. FIG. 4 is a diagram with a vector 402 from an origin O (e.g., at point (0,0)) to data point A 302 (called vector A 402) and a vector 404 from the origin O to the data point B 304 (called vector B 404). Point A 302 can be located at coordinate (A·x, A·y) and point B 304 can be located at coordinate (B·x, B·y). The angle 410 between the vector A 402 of the data point A 302 and the vector B 404 of the data point B 304 can be used to determine the distance between the data point A 302 and the data point B 304. The angle 410 can be determined by first finding the scalar length 406 of vector A 402 and the scalar length 408 of vector B 404, and then using the lengths 406 and 408 to compute the angle 410 between the vectors 402 and 404.

Figure 5:
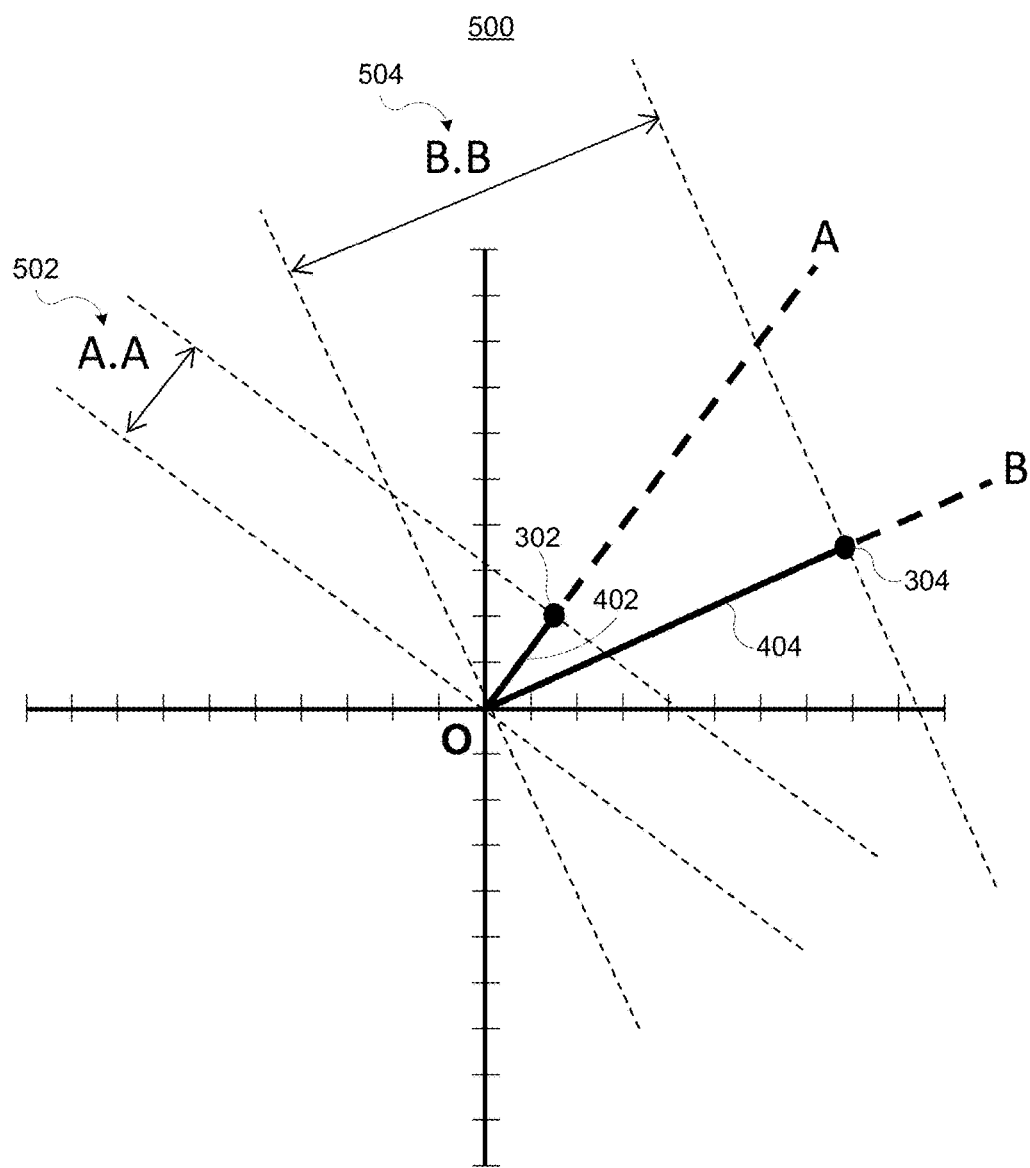
FIG. 5 is a diagram illustrating how a length of two vectors is determined.

The scalar lengths 406 and 408 can be determined using any suitable technique for determining a length of a vector. One example, shown in FIG. 5, includes finding the scalar length 406 of vector A 402 (for data point A 302) by finding the dot product A·A 502. The dot product A·A 502 is the dot product of the vector A 402 with itself. Similarly, the scalar length 408 of vector B 404 (for data point B 304) can be determined by finding the dot product B·B 504, which is the dot product of the vector B 404 with itself.

Figure 6:
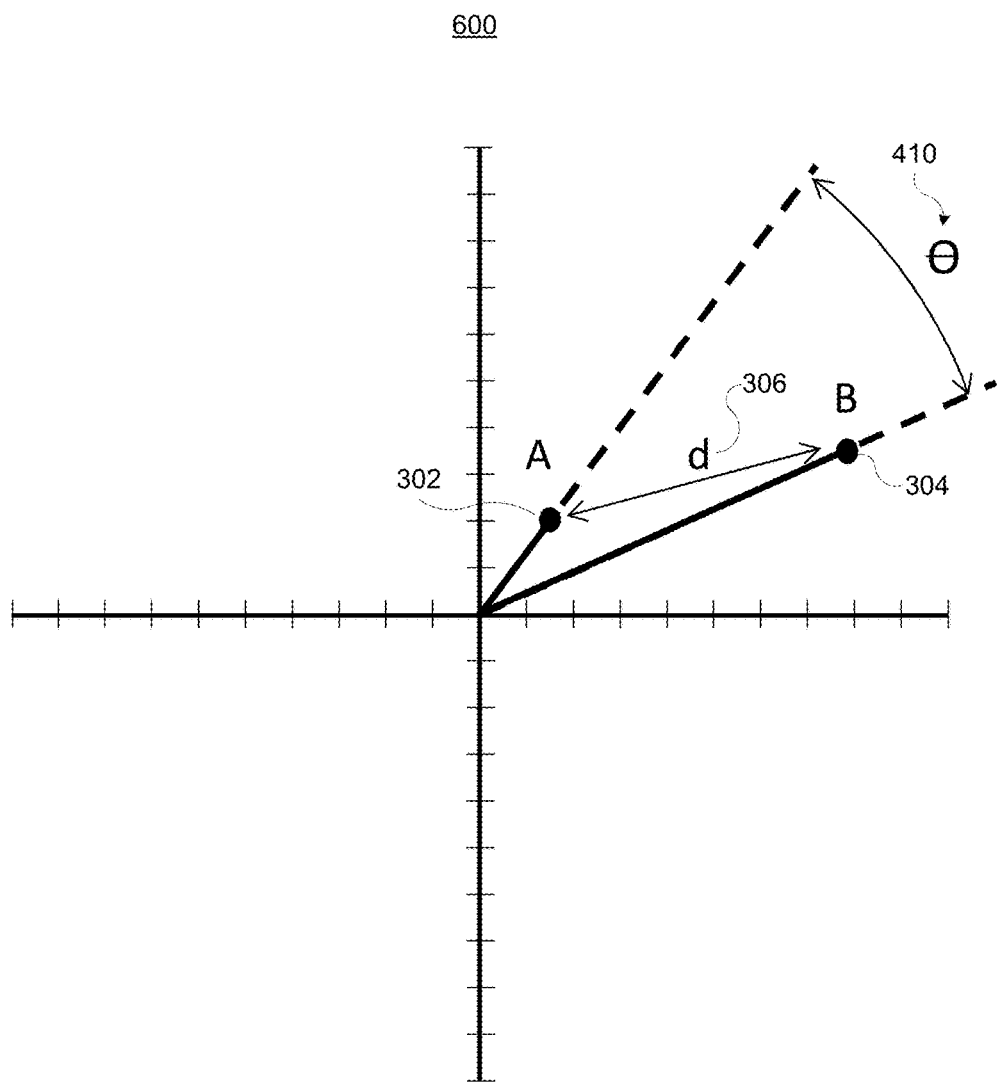
FIG. 6 is a diagram illustrating how a distance between two points is determined.

Once the angle 410 and the scalar lengths 406 and 408 are determined, the distance 306 can be determined. For example, FIG. 6 is a diagram showing the final step in computing the vector distance 306 between data point A 302 and data point B 304. In one illustrative example, the distance 306 can be determined using the angle 410 by applying the Pythagorean identity using the formula:

$$d^2 = (\sin(\theta)*B\cdot B)^2 + (A\cdot A - \cosine(\theta)*B\cdot B)^2,$$

where θ is the angle 410.

Systems and methods are described herein for determining the distance between data points using vector projections, requiring less data to be stored than the techniques described above. Considering that the dot product A·A is the length of the vector A 402 from the origin O to point A 302, and that the dot product B·B is the length of the vector B 404 from the origin O to point B 304, both of these length values (lengths 406 and 408) can be calculated (e.g., for reference data points) in advance and each length 406 and 408 can be stored as a single number. The only reason to retain an actual point values is for the purposes of calculating the dot product: A·B. An actual unknown data point value should be stored because it is not obtained before run-time when a matching process is performed. For example, an unknown data point is needed during the matching process to compare with the data stored for reference data points. In one example using television content, the matching systems 100 and 200 receive an unknown data point (e.g., data point B 304) when a television sends video data being presented. However, reference data points (e.g., reference data point A 302) can be discarded after they are used to determine information that can then be used to determine the angle between data point vectors (e.g., vectors A 402 and B 404) using projected vectors, as described in more detail below. It is advantageous to discard, and to not to keep, the actual values of reference data points while still being able to calculate the distance between a reference data point (point A) and an unknown data point (point B).

The points A 302 and B 304 have vectors 402 and 404 from an origin (e.g., of (0, 0)) to the respective points. The goal of the candidate determination engine (e.g., candidate determination engine 114 or 214) is to find the distance d 306 between the points A 302 and B 304 in order to identify candidate data points. In some examples, the distance d 306 can be calculated with only the length of vector A 402 (the vector through point A), the length of vector B 404 (the vector through point B), and the angle 410 between vector A 402 and vector B 404.

In some examples, the angle of vector A 402 to the X axis could be stored and then the angle 410 could be calculated, but a disadvantage to this approach would be as the number of dimensions is increased, the system would have to maintain and store angles in every dimension. The result would be a system storing as many numbers defining each point as were previously required (e.g., when all reference data point values are stored).

The systems and methods described herein include generating a number of projections in a defined number of dimensions. For example, a number of vectors can be projected in different directions, such as around the space in which vector A 402 and vector B 404 lie. While the examples described herein use 80 total projected vectors as an illustrative example, one of ordinary skill in the art will appreciate that any number of projections can be generated. The projected vectors can be used to determine the angle between two vectors (e.g., vector A 402 and vector B 404), which can reduce the amount of data needed at run-time during the matching process performed by a matching engine. Using the projection technique, reference data points can be discarded after they are initially used, as described further below.

In one illustrative example briefly describing the technique using projections, 80 regularly distributed vectors may be projected at ten degrees each, in which case theta between the projections is equal to ten. For example, if vector A 402 and vector B 404 are 103 degrees apart, there would be an expected five projections between the vectors A 402 and B 404. It might intuitively seem that there would be 10 projections between the vectors A 402 and B 404, but there are five. For example, projections extend in both directions and a projection projecting into the third quadrant will still be "in between" A and B as far as the angle is concerned. However, for the purpose of the examples discussed herein, each projection can be considered as being only in one quadrant, as this would be close enough for conceptual purposes. In this example, because five of the vectors out of the 80 projected vectors fall between vector A 402 and vector B 404, it can be determined that the angle between vector A 402 and vector B 404 is 10 degrees, as described in more detail below. Once the angle 410 between the two vectors A 402 and B 404 and the lengths of vector A 402 and vector B 404 are determined, trigonometry can then be used to calculate the distance d 306 between the points A 302 and B 304. Further details are provided with respect to FIG. 7-FIG. 10.

FIG. 7-FIG. 10 illustrate a technique of finding the vector distance between two points without the need to store the actual values or coordinates of the reference data points by using projected vectors to determine an angle between points. An arbitrary number of random projections is generated. In one illustrative example, a set of 80 random vectors are generated around a 360-degree axis.

For each reference data point in the reference database, a matching system determines whether each projected vector is to the algebraic right or to the algebraic left of each vector of each reference data point (e.g., vector A 402 of point A 302), such as by calculating the dot product of a vector (from an origin to a reference data point) with a projected vector, as described below with respect to FIG. 7 and FIG. 8. The results of the dot products of the projected vectors and the reference data points can be stored as a binary word and used when an unknown data point is received to determine projected vectors that fall between a reference data point and an unknown data point. In addition to determining the position of the projected vectors relative to each reference data point, a respective length of each reference data point vector (from an origin to a reference data point) is calculated. The length of a reference point vector is a distance of the vector from an origin point, and can be determined by performing a dot product of the vector with itself. The matching system can store the bits representing the algebraic left and right binary data and the lengths (or distances) of the reference data point vectors. During run time when comparing an unknown data point to reference data points to identify candidate data points, a matching system only needs to load the bits representing the algebraic left and right binary data (described in detail below) as well as the length for each reference data point vector into memory. Consequently, there is no need to load the actual reference data points, and the reference data point bits can be discarded once the left and right binary data and vector lengths are determined for the reference data points.

When an unknown data point is received (e.g., when a video data point is received from a television), the matching system can determine candidate data points from the information stored for the reference data points (e.g., the left and right binary data and vector lengths for the reference data points), for example, by searching for nearest neighbor points in the reference database. The matching system can then determine whether the projected vectors are to the algebraic right or left of a vector for the unknown data point (e.g., by taking the dot product) to get the left and right binary values. The matching system can also calculate the length of the vector of the unknown data point. Projected vectors that fall between a reference data point and an unknown data point can be used to determine an angle between the vector of the reference data point and the vector of the unknown data point.

Figure 7:
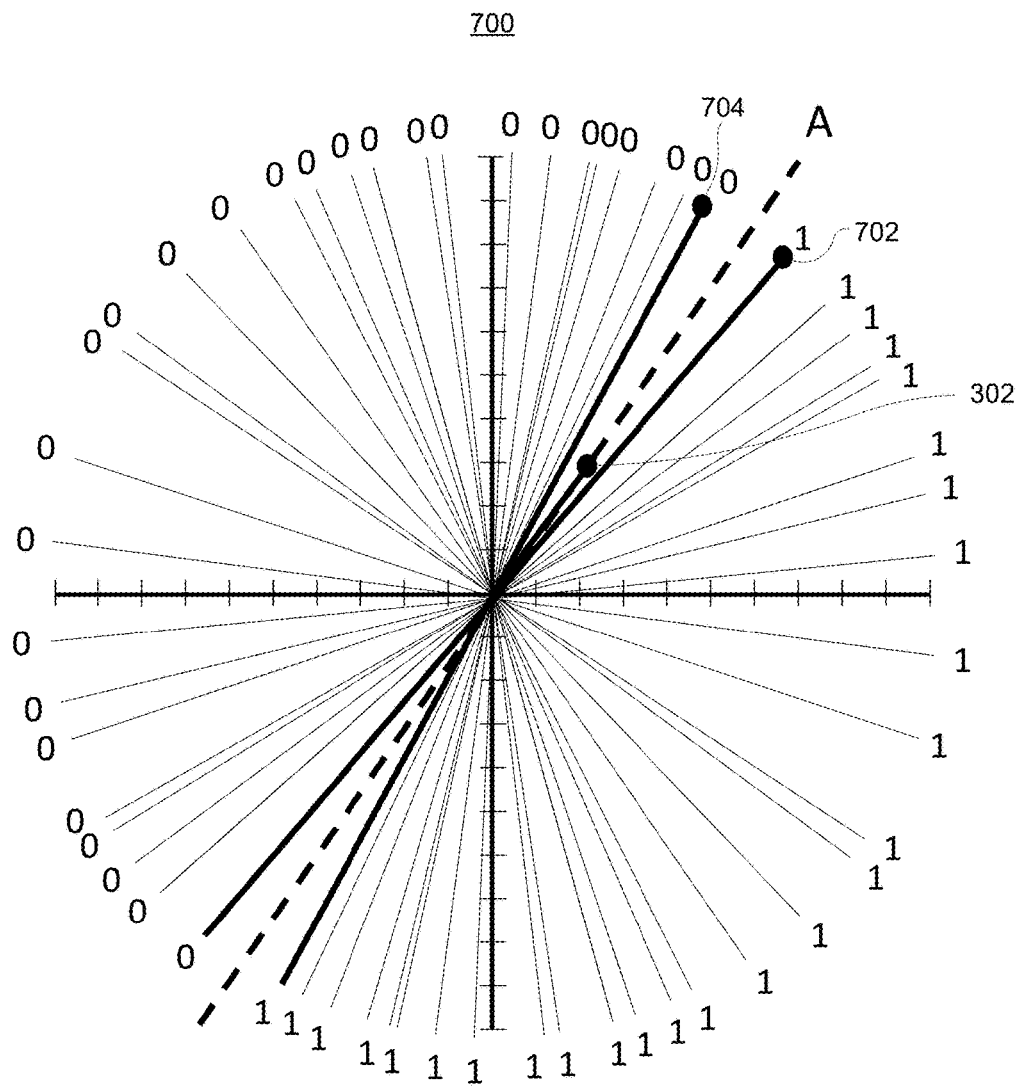
FIG. 7 is a diagram illustrating projected vectors relative to a data point.
Figure 8:
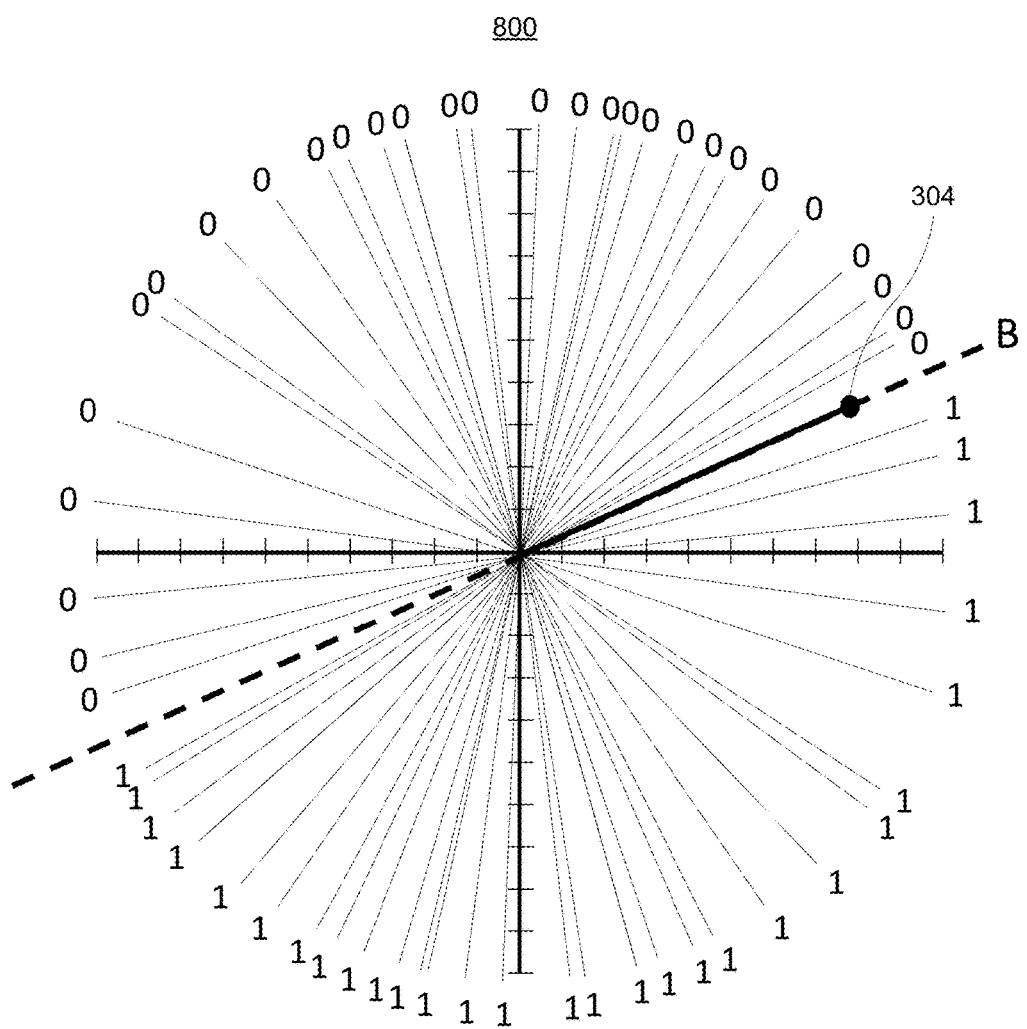
FIG. 8 is a diagram illustrating projected vectors relative to another data point.
Figure 9:
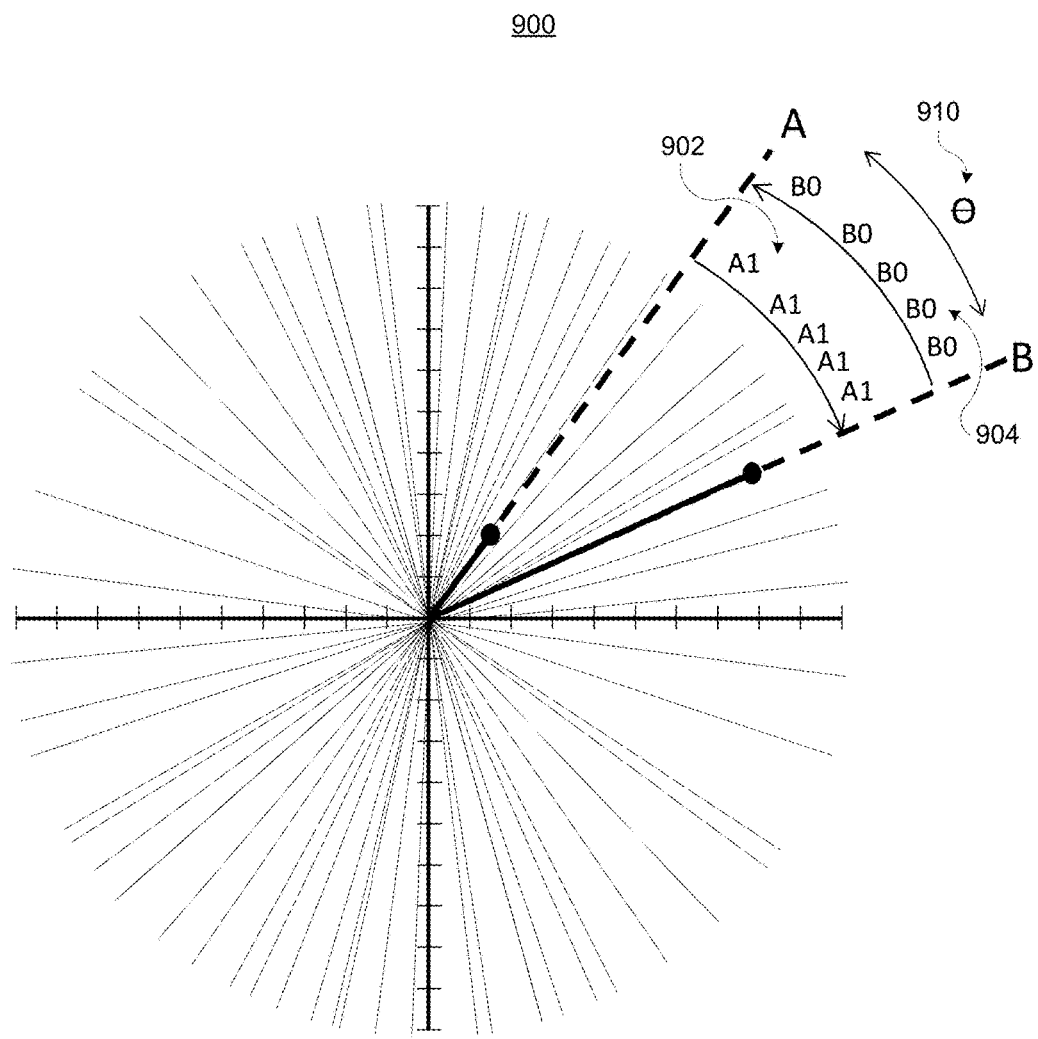
FIG. 9 is a diagram illustrating how an angle between two vectors is determined using projected vectors.

FIG. 7-FIG. 9 illustrate a technique for determining projections that fall between the reference data point A 302 and the unknown data point B 304. In order to determine if a projected vector falls between reference data point A 302 and unknown data point B 304, it is determined which projections are to the algebraic left of point A 302 and point B 304, and which projections are to the algebraic right of point A 302 and point B 304. The projections that are to the algebraic right of point A 302 and that are to the algebraic left of point B 304 fall between points A 302 and B 304.

For example, as shown in FIG. 7, the projected vectors are evaluated with respect to point A 302 by determining whether each projected vector is to the algebraic right or to the algebraic left of point A 302 (and thus vector A 402). In one example, whether a projected vector is to the algebraic right or algebraic left of point A 302 can be determined by taking the dot product of the projected vector and the vector A 402 (from the origin O to the reference point A 302). For example, the dot product of projected vector 702 and vector A 402 equals a positive number, indicating the projected vector 702 is to the algebraic right of point A 302 and vector A 402. A binary value of 1 can be stored for the projected vector 702 with respect to point A 302, indicating the vector 702 is to the algebraic right of point A 302 and vector A 402. As another example, the dot product of projected vector 704 and vector A 404 equals a negative number, indicating that the projected vector 704 is to the algebraic left of the point A 302 and vector A 402. A binary value of 0 can be stored for the projected vector 704 with respect to point A, indicating it is to the algebraic left of point A 302 and vector A 402. The same calculation can be performed for all projected vectors with respect to point A 302. As shown in FIG. 7, all projected vectors to the algebraic left of point A 302 (and vector A 402) are stored relative to point A 302 with binary value 0, and all projected vectors to the algebraic right of point A 302 (and vector A 402) are stored relative to point A 302 with binary value 1. One of ordinary skill in the art will appreciate that a 0 value could be stored for projected vectors that are to the right of point A 302 and a 1 value could be stored for projected vectors that are to the left of point A 302.

FIG. 8 illustrates the same calculation being applied to point B 304, resulting in respective 1's and 0's being stored for the projected vectors relative to point B 304. For example, the projected vectors are evaluated with respect to point B 304 by determining whether each projected vector is to the algebraic right or to the algebraic left of the point B 304 (and thus vector B 404). In one example, whether a projected vector is to the algebraic right or algebraic left of point B 304 can be determined by taking the dot product of the projected vector and the vector B 404 (from the origin O to the reference point B 304). For example, all projected vectors to the algebraic left of point B 304 (and vector B 404) are stored relative to point B 304 with binary value 0, and all projected vectors to the algebraic right of point B 304 (and vector B 404) are stored relative to point B 304 with binary value 1. One of ordinary skill in the art will appreciate that a 0 value could be stored for projected vectors that are to the right of point B 304 and a 1 value could be stored for projected vectors that are to the left of point B 304.

FIG. 9 illustrates the projected vectors that fall between point A 302 and point B 304. The projected vectors that fall between points A 302 and B 304 include the projections that are to the algebraic right of point A 302 (shown by the A1 values 902) and that are to the algebraic left of point B 304 (shown by the B0 values 904). The projected vectors falling between point A 302 and point B 304 can be determined by taking the exclusive OR (XOR) of the 80 binary vector values stored with respect to point A 302 with the 80 binary vector values stored with respect to point B 304. The result of the XOR generates the projected vectors that have the A1 values 902 and the B0 values 904, shown in FIG. 9.

Figure 10:
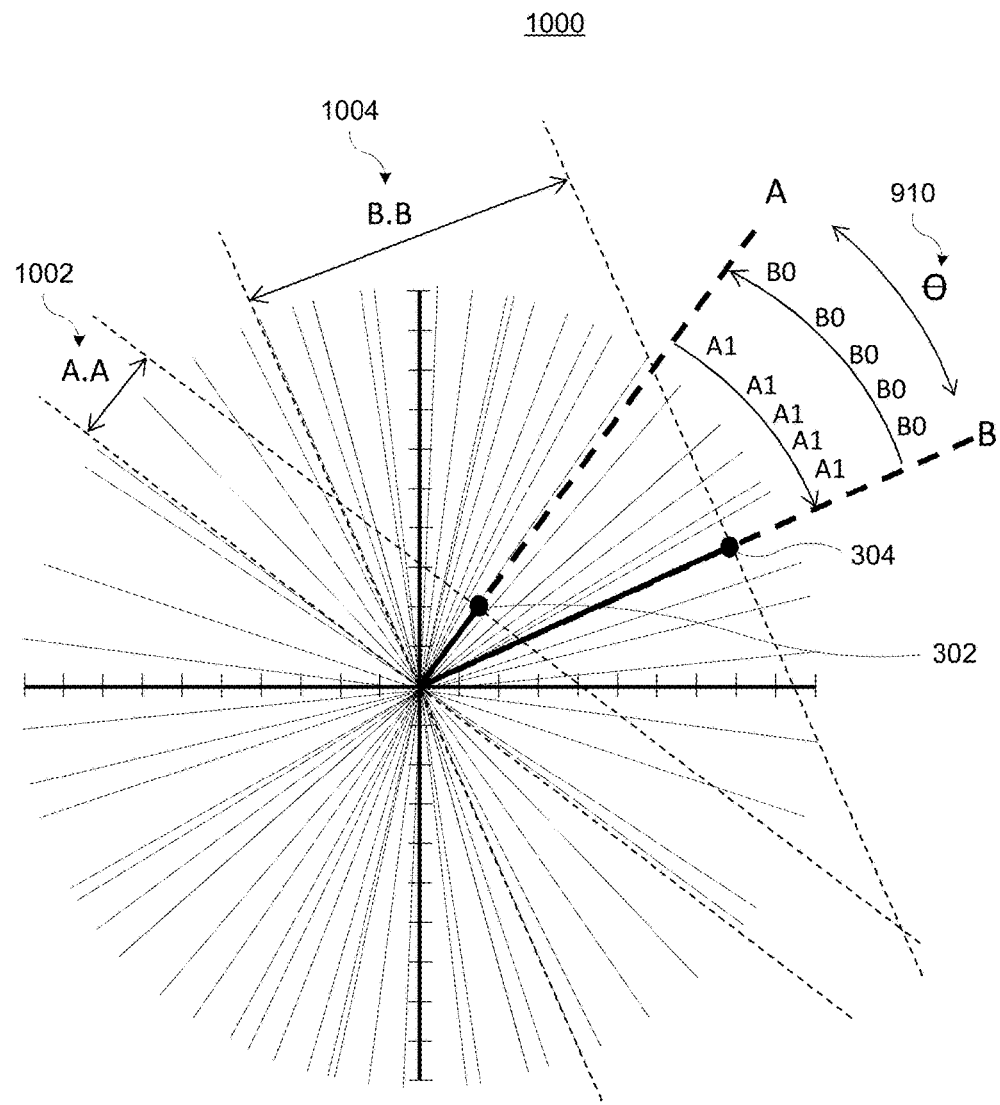
FIG. 10 is another diagram illustrating how an angle between two vectors is determined using projected vectors.

FIG. 10 shows all of the components required to find the angle 910 between point A 302 and point B 302. The angle 910 between vector A 402 (of data point A 302) and vector B 404 (of data point B 304) can then be found based on the number of projections between points A 302 and B 304. The angle determination is approximate, but close enough to obtain an accurate distance d between points A 302 and B 304. In one example, the approximate angle between a reference data point vector and an unknown data point vector is determined by multiplying a constant by a ratio. The ratio includes the number of the projected vectors between the reference data point and the unknown data point divided by a total number of the projected vectors. The constant can be a pre-defined number, such as 180. For example, the angle 910 between point A 302 and point B 304 includes the result of the exclusive OR operation divided by the total number of vectors (80 in this example).

When it comes time to calculate the distance between the unknown data point 304 and the reference data points (including data point A 302), the exclusive OR is calculated between the binary data (for the projections) of each reference data point to the binary data value of the unknown data point. As noted above, the result of the exclusive or between the binary data of the unknown data point (e.g., data point B 304) and a reference data point (e.g., data point A 302) is the number of projections between the unknown data point and the reference data point. Again, the derived angle 910 equals the number of projections between the data points 302 and 304 divided by the number of total projections (80 in this example), multiplied by 180. The derived distance can then be computed by performing a Pythagorean identity calculation using the formula:

$$d^2 = (\sin(\theta) * B \cdot B)^2 + (A \cdot A - \cos(\theta) * B \cdot B)^2$$

The dot product B·B represents the length of the vector B 404, and the dot product A·A represents the length of the vector A 402.

Once the distance from the unknown data point B 304 to the reference data points stored in a reference database is determined, candidate data points can be determined, as described previously. The unknown data point B 304 can then be identified by one of the candidate data points. For example, one of the reference data points can be determined as a closest match with the unknown data point B 304. The unknown data point B 304 can then be identified as being the same data as the candidate data point found as the closest match. In some examples, a nearest neighbor approach can be used to identify candidate data points, and a path pursuit algorithm can be used to identify the unknown data point. Details of the nearest neighbor and path pursuit techniques are described with respect to FIG. 23-FIG. 27.

Using the above-described vector projection technique, less data is needed to determine a distance between a reference data point and an unknown data point. Such a technique can be used to find candidate data points among a plurality of reference data points. As described previously, the length of the vector A 402 (denoted by the dot product A·A) is already known before the unknown data point is received, and thus is not needed at run time to determine the distances for generating candidate data points. The only data needed are the lengths (or distances) of the reference data point vectors and the bits representing the algebraic left and right binary data of projected vectors relative to the reference and unknown data points (which are used to determine the angle between reference and unknown data point vectors). For example, since dot products are calculated for all of the projected vectors with respect to point A 302 (before the matching process) and for all of the projected vectors with respect to point B 304, the matching system can store a bit for each projection for each reference data point and a bit for each projection for the unknown data point, in addition to the vector lengths of the reference data points. Accordingly, when comparing an unknown data point to reference data points to identify candidate data points at run time, the matching system can discard the actual reference data points.

An advantage of the vector projection technique described above is that the exact amount of data saved depends on how many projections are needed to obtain acceptable results. For example, each projection adds one bit to memory use when compared to one data point, so if the number of random projections is a reasonable number, such as 80, an original 75-byte dataset (point) can be replaced with a 10-byte left/right binary structure plus, for example, 2 bytes for the length of the vector for that point, totaling 12 bytes. Such an example provides a savings of 63 bytes for each point in memory. Hence, the vector projection technique provides a highly advantageous reduction in data size when computing large data searches and comparisons, and can be used for many large-scale applications.

Figure 11:
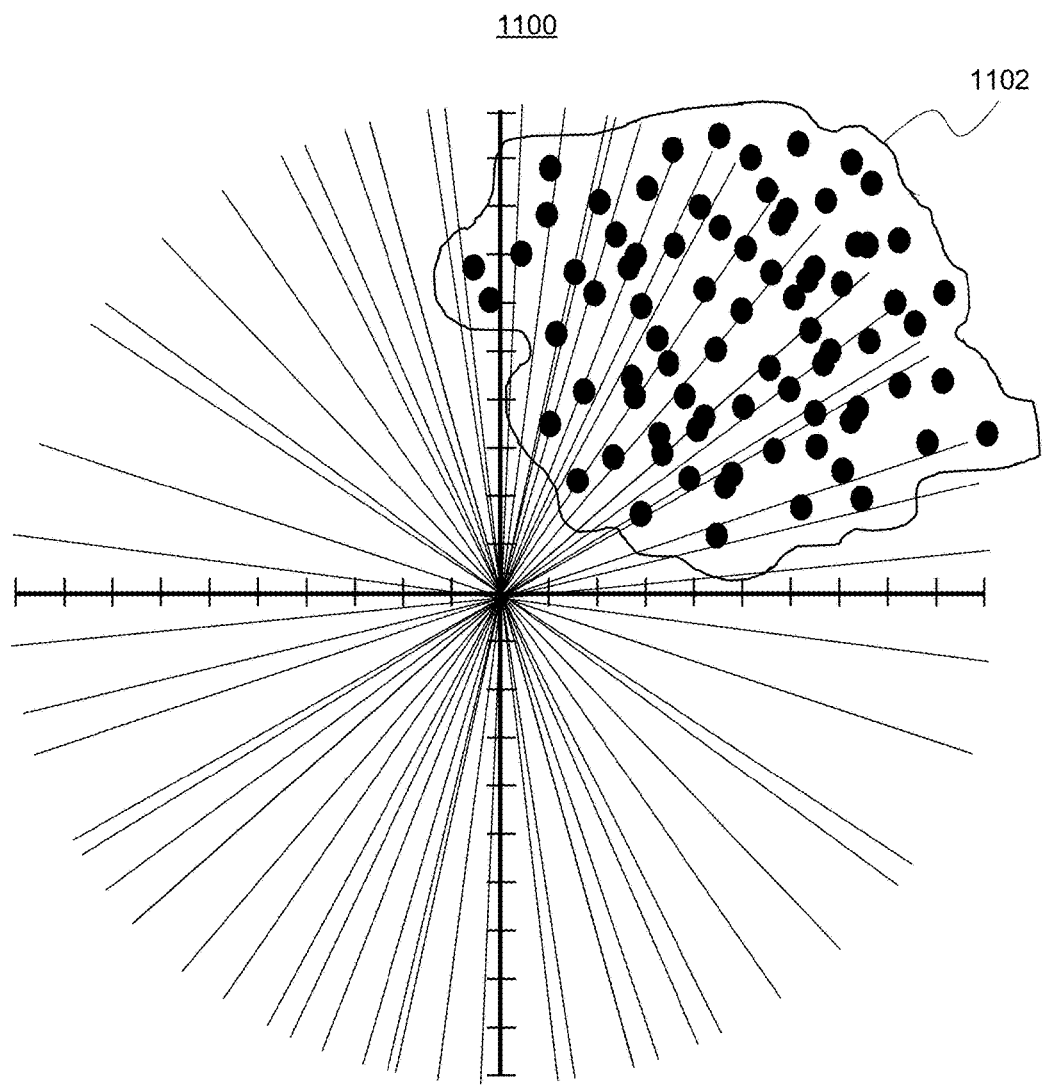
FIG. 11 is a diagram illustrating data clustering of data generated by a matching process.

FIG. 11 illustrates the data 1101 generated by the matching process performed by a matching engine. The data 1101 can represent incoming data, such as reference data and/or unknown data. In the example shown in FIG. 11, the cluster of data points is not centered on the projected vectors. For example, the location of the cluster of data points is shown with the cluster's origin not centered with the vector projections. Accordingly, the projected vector set is disadvantageously positioned away from the statistical center of the cluster of data. Moving the origin of the vector projections to the middle of the vector space can make the projections more productive and can generate optimal results.

Figure 12:
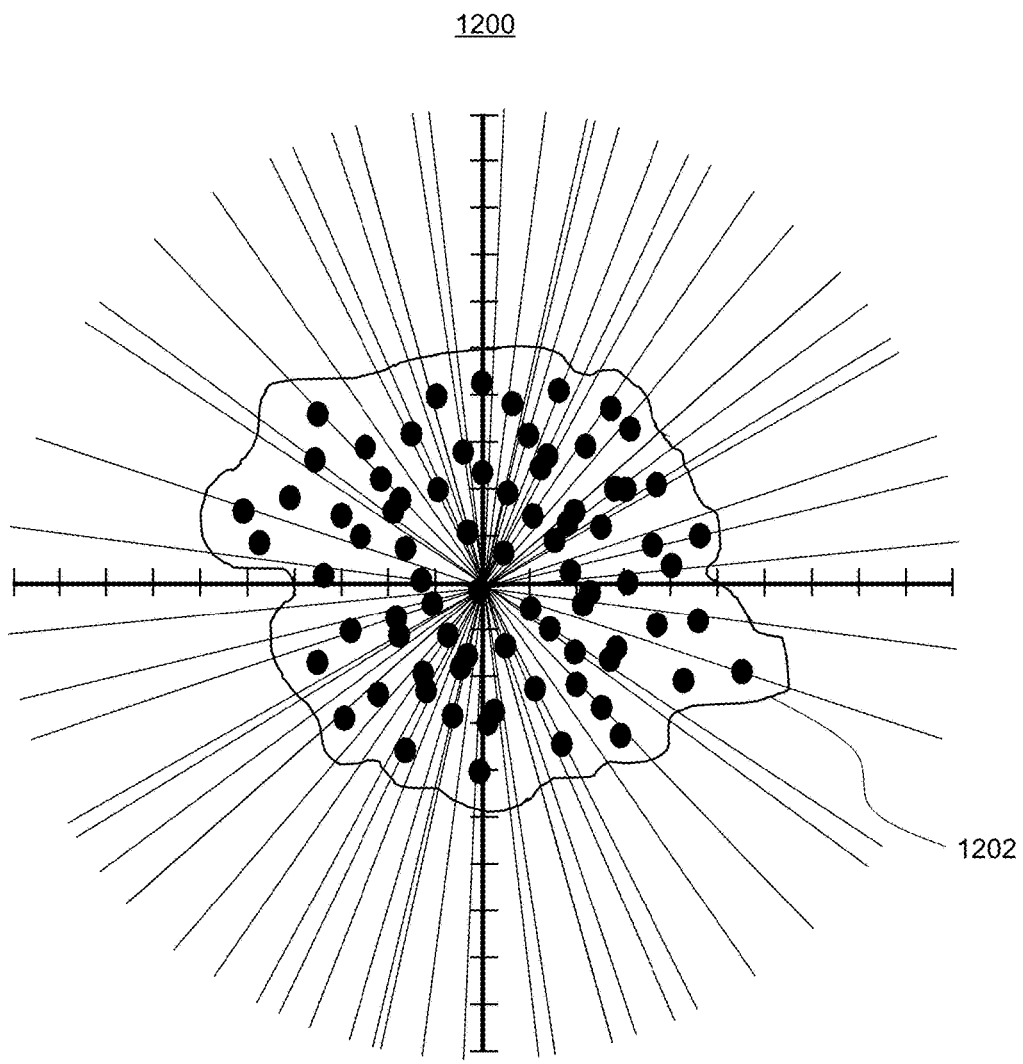
FIG. 12 is another diagram illustrating data clustering of data generated by a matching process.

FIG. 12 illustrates the data 1202 generated by the matching process, which can be similar to the data 1101 shown in FIG. 11. Using statistical means well known to the skilled person, an offset can be calculated to center the projected vectors, as shown in FIG. 12. In this example, the cluster of vectors is re-centered on a representative sample of typical system data. The group center is found by a statistical means which is used to offset the origin to the center of the projected vectors. For example, a statistical mean (or average) of the cluster of data can be determined. The statistical mean (or average) can be used to center the projected vector set to the approximate middle of the data cluster. Re-centering the projected vectors to the middle area of the data cluster improves results of the techniques described above.

The vectors can be projected randomly or pseudo-randomly. Pseudo-random projection includes predetermined projections in a distributed manner. For example, a machine can generate the same projections numerous times, but the projections can appear to be random. Random projections are random, though one skilled in the art would understand that they are actually selected from a normal distribution randomly. Therefore, not all space definitions are created equal. As is known to the skilled person, a Monte Carlo method can be employed to pick a random or pseudo-random projection that is good. Once a suitable, adequate random projection is picked, the random projection can be used for many distance determinations (e.g., to determine angles between many data point vectors), and there is no need to change it unless it is desirable to increase or decrease the number of projections. As this is a probabilistic calculation, the result may not be the correct answer, but will be very close to correct. A skilled person will understand that the result does not need to be "correct," but only close enough to provide a useful utility to big data applications. In order to measure an adequate random distribution, a direct suitability test is performed, as discussed in more detail below.

Figure 13:
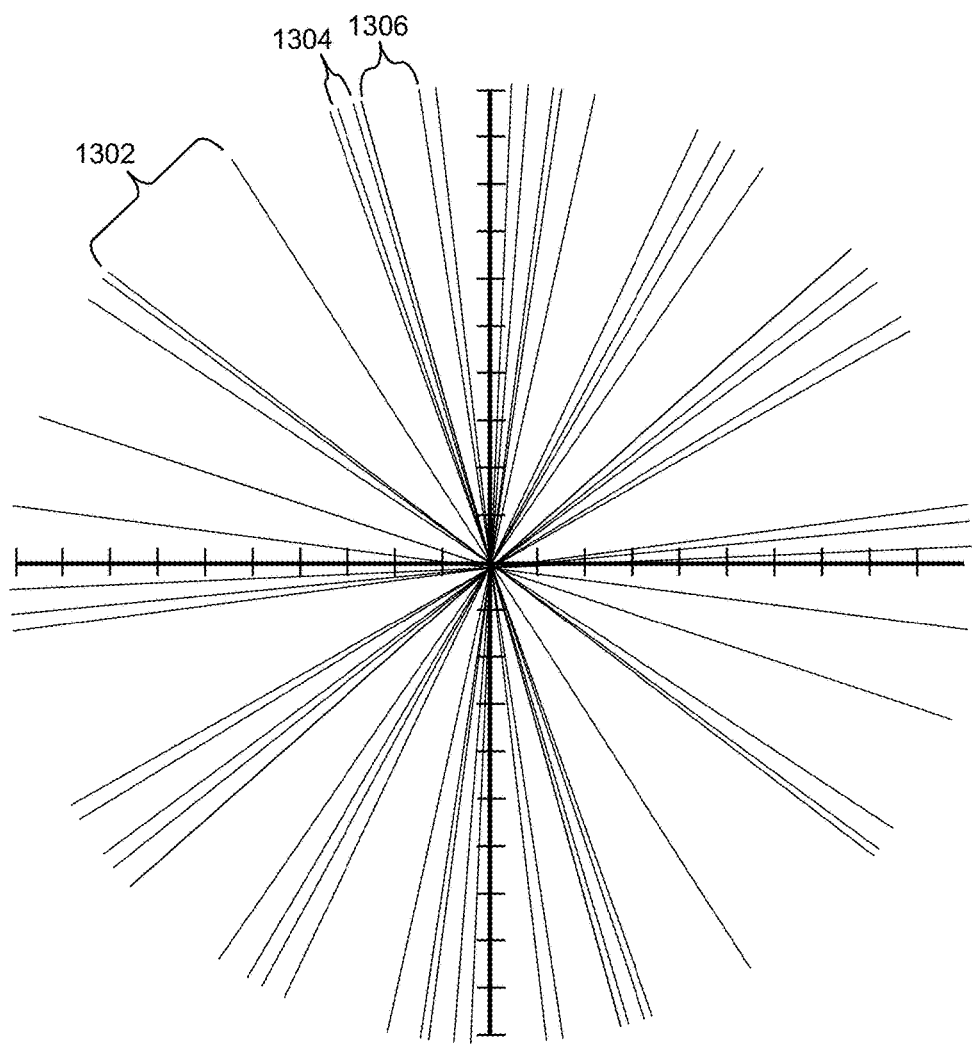
FIG. 13 is a diagram illustrating projected vectors that are unevenly distributed.

FIG. 13 illustrates the output of a random (or pseudo-random) process generating a set of projected vectors to which data is to be compared. In this example, the random process has generated vectors that are excessively clustered together, where the angular distance between vectors (e.g., gaps 1302, 1304, and 1306), is excessively uneven. The random projections appear to have too much clustering around certain values, such that the distances or gaps 1301, 1302 and 1303 show too much variance. The excessive clustering of the vectors can reduce the overall accuracy of the system. For example, a result of unevenness between vectors can include excessive average error when a matching or other process is performed using the projected vectors. The set of projected vectors in FIG. 13 are thus unsuitable.

Figure 15:
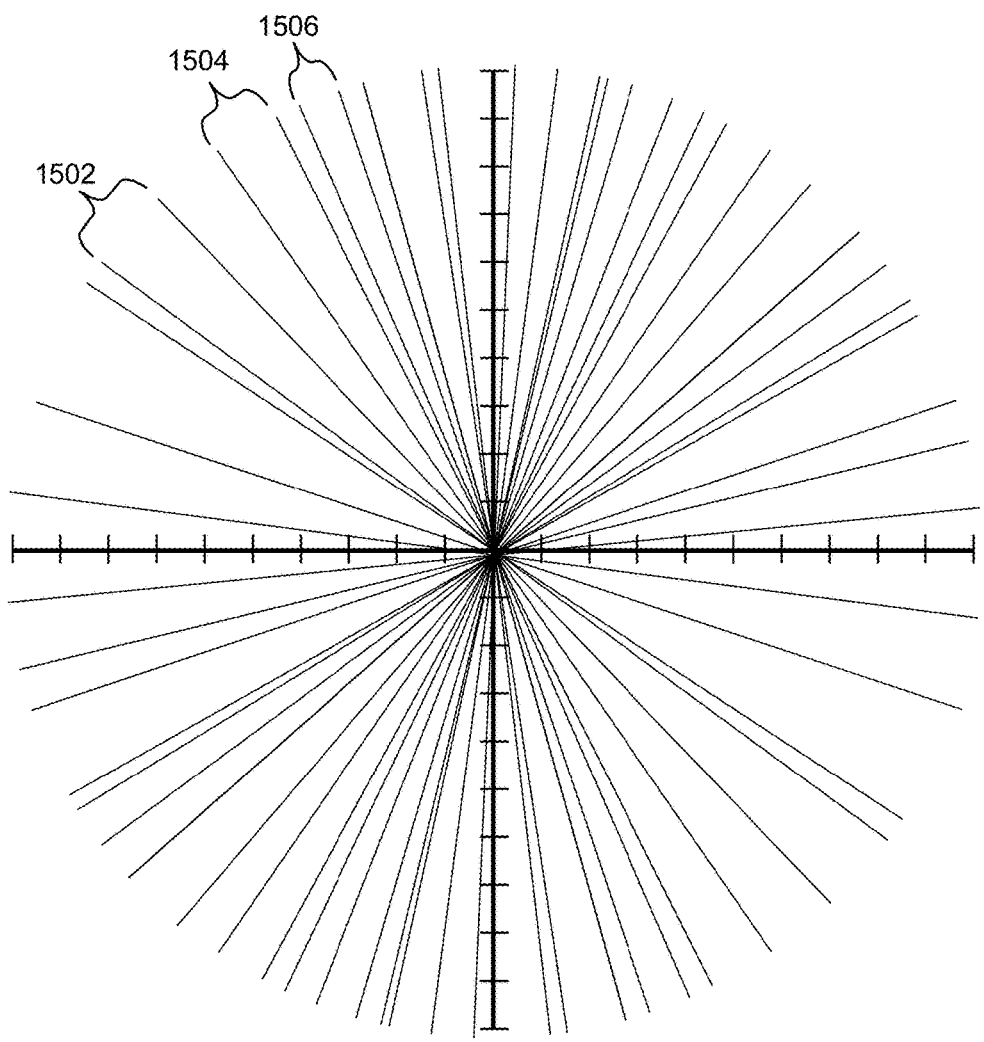
FIG. 15 is a diagram illustrating projected vectors that are more evenly clustered.

An example of a satisfactorily distributed random set of projections is shown in FIG. 15. For example, FIG. 15 illustrates the output of a random (or pseudo-random) process generating a set of projected vectors to which data is to be compared. In this example, the random process has generated vectors that are sufficiently evenly clustered, where the angular distance between vectors (e.g., gaps 1502, 1504, and 1506) is acceptable and the average error will be under a predetermined threshold (as described below with respect to FIG. 16) when a matching or other process is performed using the projected vectors. As described below, the threshold can include any suitable error value, such as 5%.

The suitability of the projections can be determined once by experimentation and kept and used for random or pseudo-random generation. For example, the suitability of the projected vectors can be determined by performing a sufficiency test that tests the distance determination technique described above (using the projections to determine an angle between vectors of a reference point and an unknown point) in comparison to prior system and comparing the results. A goal of 5% error can be used as a threshold to determine the suitability of the randomly projected vectors. One of ordinary skill in the art will appreciate that any threshold percentage can be used, depending on the particular application and required quality desired.

Figure 14:
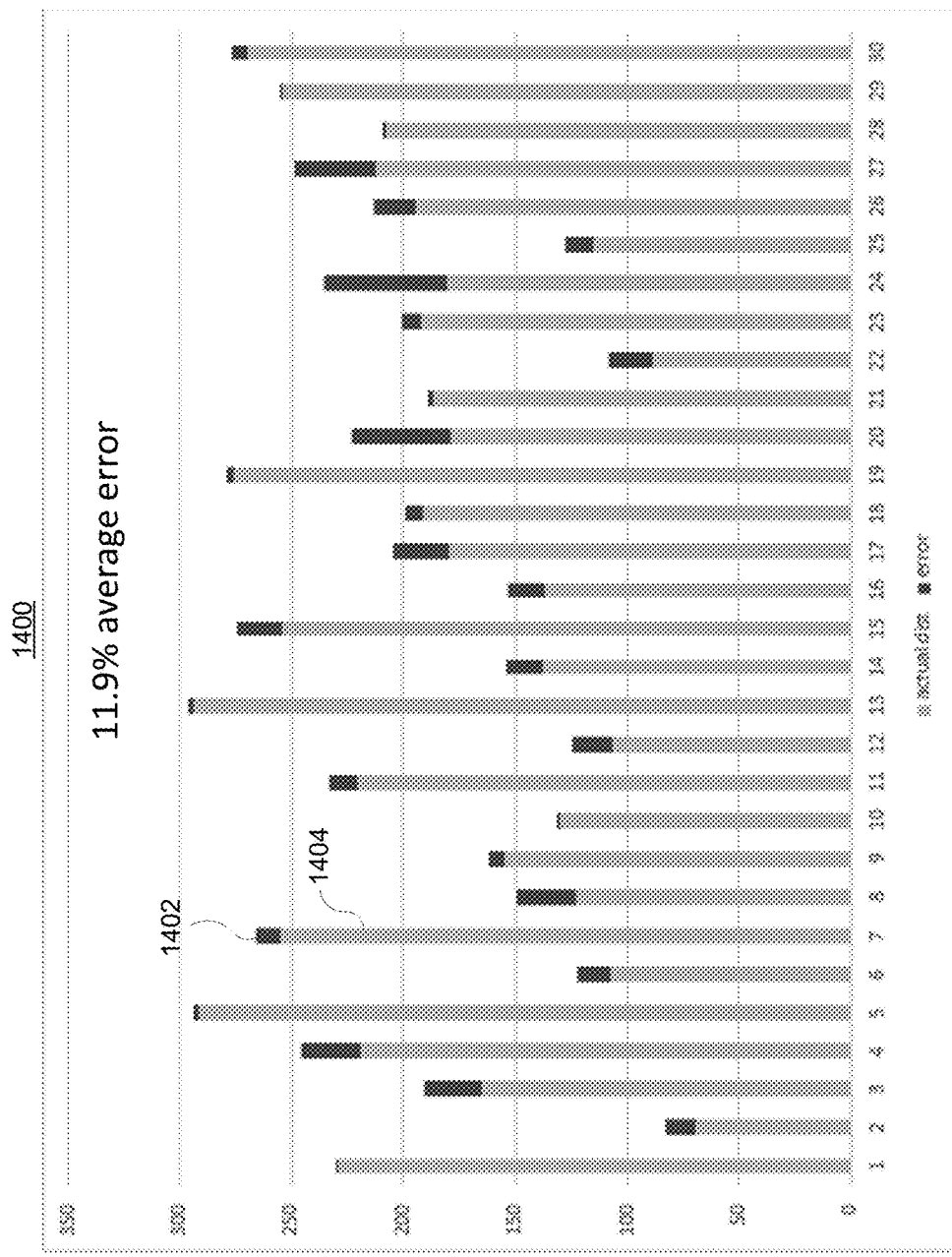
FIG. 14 is a graph illustrating actual data matched compared to data matched by the data reduction techniques discussed herein.

FIG. 14 is a graph 1400 showing an example of results 1400 of such a test using the projected vectors shown in FIG. 13. The graph 1400 shows a data comparison of actual data matched compared to data matched by the techniques described herein using vector projections. In this example, the random projections used to generate the multi-dimensional vectors were not sufficiently evenly distributed as seen plotted in two-dimensions in FIG. 13. The measured difference between actual data and reduced data was equal to 11.9%. The result of the data shown in FIG. 14 is excessive error considering the threshold. For example, using the 5% threshold, the random vectors of FIG. 13 used in the test are insufficient because the average error of 11.9% is above the predetermined threshold 5%.

Figure 16:
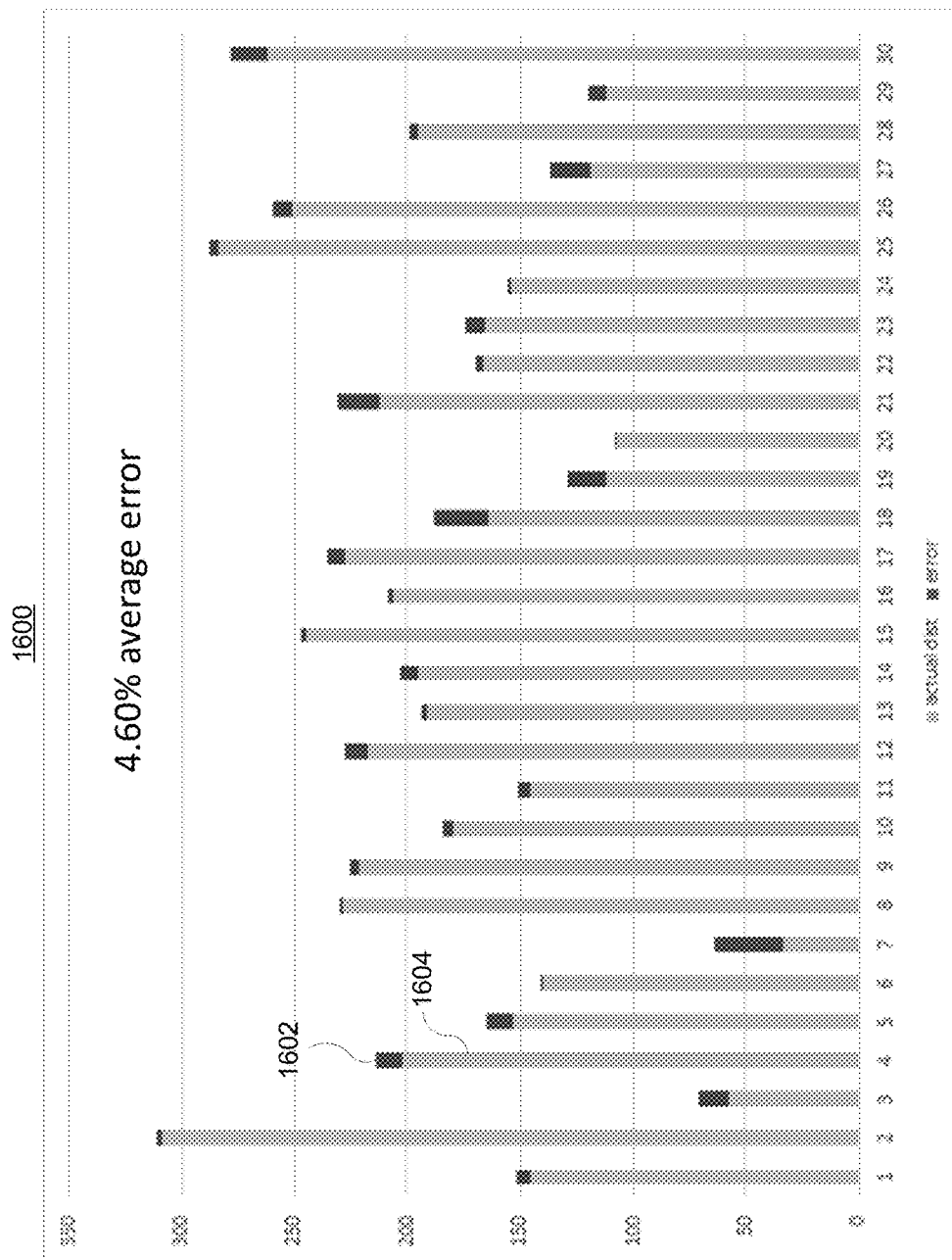
FIG. 16 is a graph illustrating actual data matched compared to data matched by the data reduction techniques discussed herein.

In such a case, another group of projections is generated to attempt to obtain a satisfactory projection. The projected vectors of FIG. 15 includes a set of sufficiently evenly distributed vectors. For example, FIG. 16 represents an example of results 1600 of the sufficiency test that include an acceptable error difference between the actual match and the matching results using the vector projection techniques described herein. The graph 1600 shows a data comparison of actual data matched compared to data matched by the techniques described herein using vector projections. In this example, the random projections used to generate the multi-dimensional vectors were sufficiently evenly distributed as seen plotted in two-dimensions in FIG. 15. The measured difference between actual data and reduced data was equal to 4.60%, which is under the 5% threshold, indicating that the random vectors shown in FIG. 15 are sufficient to obtain an accurate result.

Figure 17:
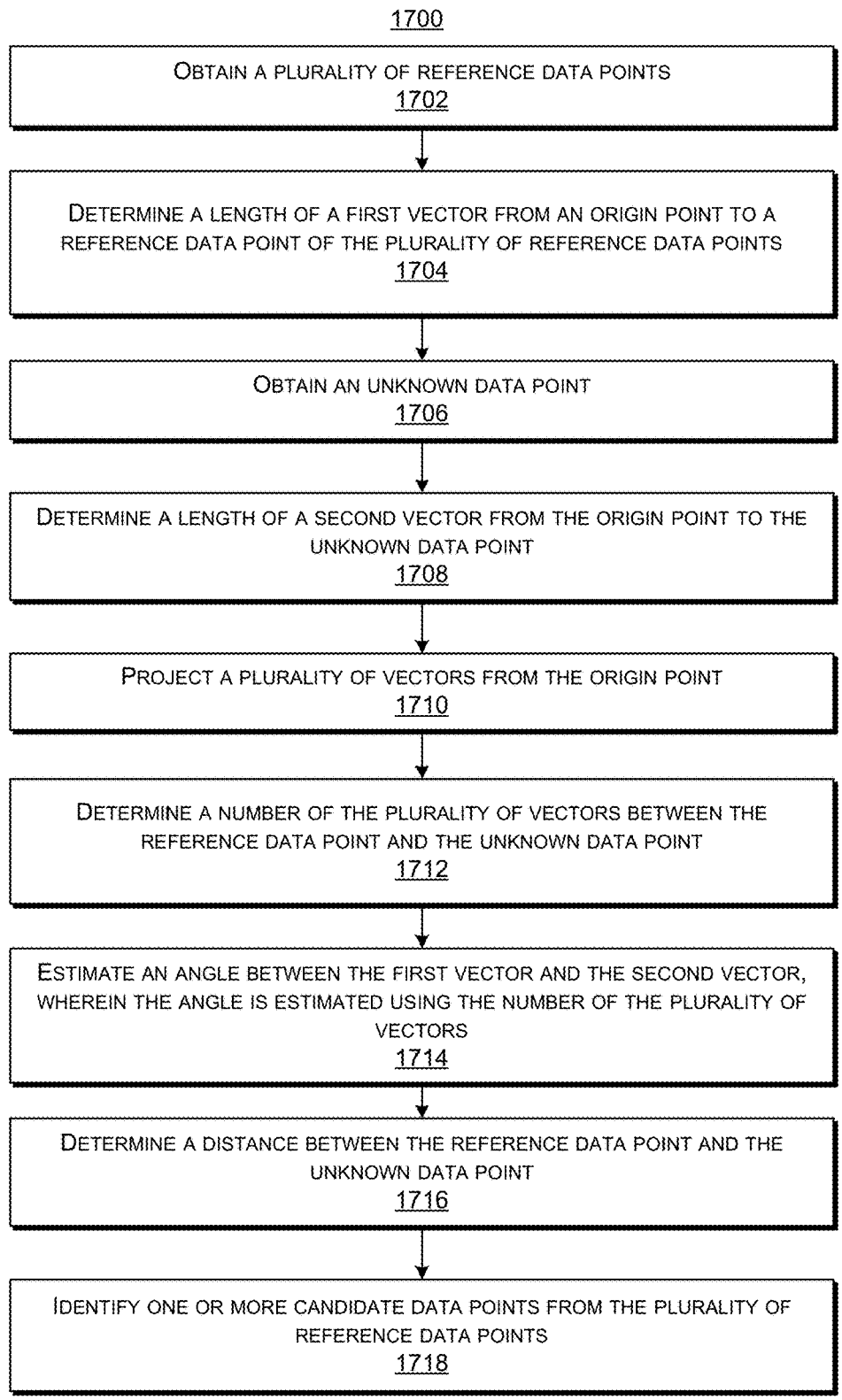
FIG. 17 is a flowchart illustrating an embodiment of a process of identifying video content being displayed and providing related content.

FIG. 17 illustrates an embodiment of a process 1700 for identifying one or more unknown data points. In some aspects, the process 1700 may be performed by a computing device, such as the matching server 104.

Process 1700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 1702, the process 1700 includes obtaining a plurality of reference data points. In some embodiments, the plurality of reference data points include data stored in a reference data base, such reference database 116 shown in FIG. 1. The reference data points can include any data that can be compared with unknown data to identify the unknown data.

At 1704, the process 1700 includes determining a length of a first vector from an origin point to a reference data point of the plurality of reference data points. The reference data point can include the data point 302, the origin can include the origin O, and the first vector can include the reference data point vector 402 shown in FIG. 3-FIG. 5. The length can be determined any suitable technique, such as by calculating a dot product of the first vector with itself.

At 1706, the process 1700 includes obtaining an unknown data point associated with content being presented by a display. At 1708, the process 1700 includes determining a length of a second vector from the origin point to the unknown data point. The unknown data point can include the data point 304, the origin can include the origin O, and the second vector can include the unknown data point vector 404 shown in FIG. 3-FIG. 5. The length can be determined any suitable technique, such as by calculating a dot product of the second vector with itself.

At 1710, the process 1700 includes projecting a plurality of vectors from the origin point. In one example, the plurality of projected vectors can include the projected vectors shown in FIG. 7-FIG. 10. The vectors can be randomly generated or can be pseudo-randomly generated, as discussed with respect to FIG. 13-FIG. 16.

At 1712, the process 1700 includes determining a number of the plurality of vectors between the reference data point and the unknown data point. In some embodiments, determining the number of the plurality of vectors between the reference data point and the unknown data point includes determining whether each vector of the plurality of vectors is to an algebraic right or to an algebraic left of the first vector of the reference data point. The determination of whether a projected vector of the plurality of vectors is to an algebraic right or to an algebraic left of the first vector can include performing a dot product on the projected vector and the first vector. Determining the number of the plurality of vectors between the reference data point and the unknown data point further includes determining whether each vector of the plurality of vectors is to the algebraic right or to the algebraic left of the second vector of the unknown data point. A dot product can also be used. Determining the number of the plurality of vectors between the reference data point and the unknown data point further includes determining the number of the plurality of vectors between the reference data point and the unknown data point. The number of the plurality of vectors includes vectors to the algebraic left of the first vector and to the algebraic right of the second vector or vectors to the algebraic right of the first vector and to the algebraic left of the second vector. One example is shown in FIG. 9 as vectors having stored A1 values 902 and B0 values 904.

In some examples, the process 1700 further includes storing a first binary value for each vector that is determined to be to the algebraic right of the first vector of the reference data point, and storing a second binary value for each vector that is determined to be to the algebraic left of the first vector of the reference data point. In one example, the first binary value can be a 0 and the second binary value can be a 1. In another example, the first binary value can be a 1 and the second binary value can be a 0.

In some examples, the process 1700 further includes storing a first binary value for each vector that is determined to be to the algebraic right of the second vector of the unknown data point, and storing a second binary value for each vector that is determined to be to the algebraic left of the second vector of the unknown data point. In one example, the first binary value can be a 0 and the second binary value can be a 1. In another example, the first binary value can be a 1 and the second binary value can be a 0.

In some examples, the reference data point is discarded after the length of the first vector of the reference data point is determined and after each vector of the plurality of vectors is determined to be to the algebraic right or to the algebraic left of the first vector. For example, the bits representing the reference data point can be removed from memory. Discarding the reference data point allows much less information to be stored by a matching system.

At 1714, the process 1700 includes estimating an angle between the first vector and the second vector. The angle is estimated using the number of the plurality of vectors. For example, estimating the angle between the first vector of the reference data point and the second vector of the unknown data point includes multiplying a constant by a ratio. The ratio includes the number of the plurality of vectors between the reference data point and the unknown data point divided by a total number of the plurality of vectors. The constant can include a pre-determined value (e.g., 180, 360, or other suitable number).

At 1716, the process 1700 includes determining a distance between the reference data point and the unknown data point. The distance is determined using the estimated angle and the determined lengths of the first vector and the second vector. For example, determining the distance between the reference data point and the unknown data point includes performing a Pythagorean identity calculation using the estimated angle and the determined lengths of the first vector and the second vector.

At 1718, the process 1700 includes identifying one or more candidate data points from the plurality of reference data points. A candidate data point is a candidate for matching the unknown data point. The one or more candidate data points are determined based on determined distances between one or more reference data points and the unknown data point. For example, a nearest neighbor algorithm can be used to determine candidates based on the distances.

In some embodiments, the process 1700 includes determining a match between the unknown data point and a candidate data point. The match is an approximate match based on the candidate data point being a closest data point of the one or more candidate data points to the unknown data point. In some embodiments, the process 1700 can determine the match by comparing the unknown data point with the one or more candidate data points to identify the unknown data point. In some examples, a path pursuit algorithm can be used to identify the unknown data point.

The techniques performed by the systems and methods described herein can be applied to any system that harvests and manipulates large volumes of data. As noted above, illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data.

In the context of automated content recognition (ACR), for example, the techniques described above can reduce the amount of data that must be stored in order for a matching system to search and find relationships between unknown and known data groups. For example, Among the many applications of the methods and systems described herein, the vector projection techniques allow identification of media segment of audio and/or video information being presented by a display (e.g., a television (TV), a smart TV, a TV with a cable or satellite feed, an Internet-enabled video set-top box, a mobile device, or any other viewing device). Furthermore, a segment identification system can accurately identify segments of any type whether they are being broadcast, include previously-recorded programming, or include commercial messages. By using the vector projection techniques, a video-based ACR system can reduce the amount of video data that must be stored for reference.

Matching video segments of television programming will be used below as one example of an application of the vector projection techniques described herein. However, one of ordinary skill in the art will appreciate that the techniques and systems described herein can be applied any number of large database searches, analysis, and comparison problems, also known in a general sense as "big data analytics."

Figure 18:
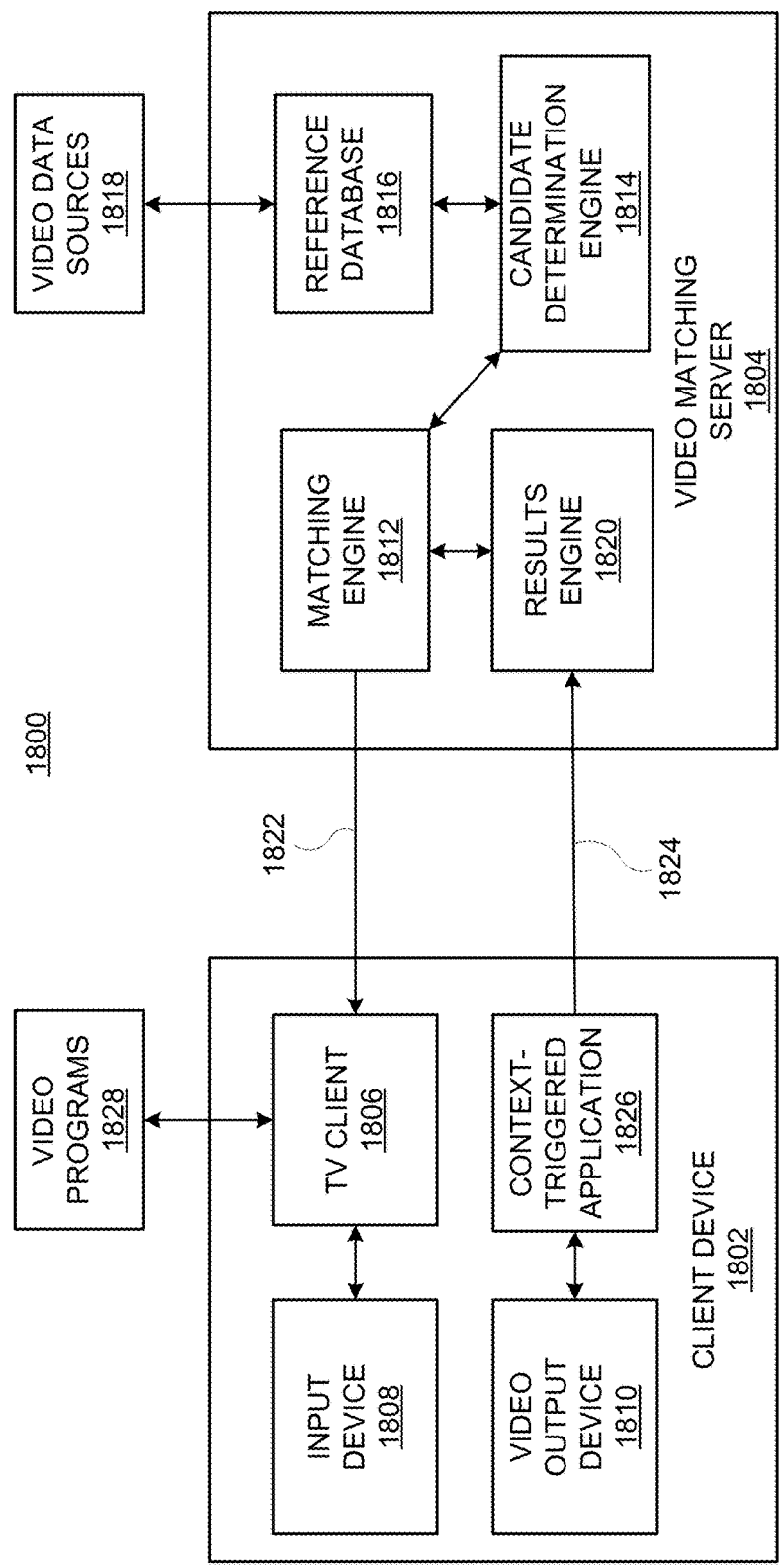
FIG. 18 is a block diagram of an example of a matching system for identifying video content being viewed by a display.

FIG. 18 illustrates an example of a video matching system 1800 that can improve data efficiency using the vector projection techniques described herein. A television (TV) client 1806 of a client device 1802, which can include a television system, can decode television signals associated with video programs 1828. The TV client 1806 can place the decoded contents of each frame of the video into a video frame buffer in preparation for display or for further processing of pixel information of the video frames. A client device 1802 can be any television decoding system that can receive and decode a video signal. The client device 1802 can receive video programs 1828 and store video information in a video buffer (not shown). The client device 1802 can processes the video buffer information and produces unknown data points (which can referred to as "cues"), described in more detail below with respect to FIG. 20. The TV client 1806 can transmit the unknown data points to the video matching server 1804 for comparison with reference data points in the reference database 1816, similar to the techniques described above.

The matching system 1800 can begin a process of matching video segments by first collecting data samples from known video data sources 1818. For example, the video matching server 1804 collects data to build and maintain a reference video database 1816 from a variety of video data sources 1818. The video data sources 1818 can include television programs, movies, or any other suitable video source. The video data sources 1818 can be provided as over-the-air broadcasts, as cable TV channels, as streaming sources from the Internet, and from any other video data source. In some embodiments, the video matching server 1804 can process the received video from the video data source 1818 to generate and collect reference video data points in the reference database 1816, as described with respect to FIG. 18 below. In some embodiments, video programs from video data sources 1818 can be processed by a reference video program ingest system (not shown), which can produce the reference video data points and send them to the reference database 1816 for storage. The reference data points can be used as described above to determine information that is then used to analyze unknown data points. For example, the reference data points can be analyzed with respect to a plurality of projected vectors to obtain left and right binary data. The lengths of vectors related to the reference data points can also be determined. Once the lengths of the reference data point vectors and left and right binary data are determined for the reference data points, the actual reference data point bits can be discarded.

The video matching server 1804 can store reference video data points for each video program received for a period of time (e.g., a number of days, a number of weeks, a number of months, or any other suitable period of time) in the reference database 1816 until the necessary information is determined. The video matching server 1804 can build and continuously or periodically update the reference database 1816 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, discarding the actual reference video data point bits is advantageous in reducing the storage load of the video matching server 1804.

Figure 19:
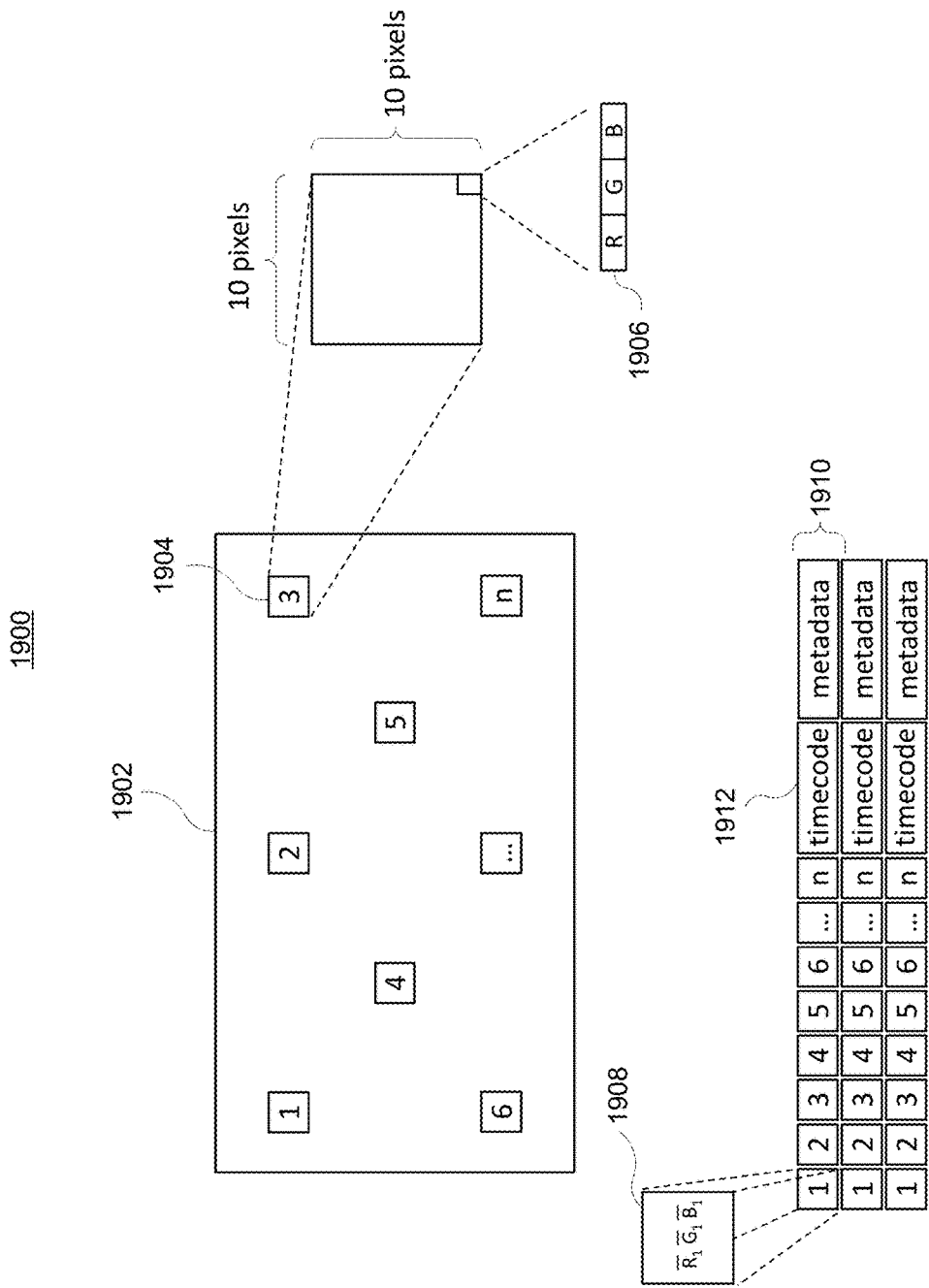
FIG. 19 is a block diagram of an example of a video capture system.

In one illustrative example, FIG. 19 illustrates a video ingest capture system 1900 including a memory buffer 1902 of a decoder. The decoder can be part of the video matching server 1804 or the TV client 1806. The decoder may not operate with or require a physical television display panel or device. The decoder can decode and, when required, decrypt a digital video program into an uncompressed bitmap representation of a television program. For purposes of building a reference database of reference video data (e.g., reference database 1816), the video matching server 1804 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 1904) is shown in FIG. 19. As noted above, a pixel patch can include an array of pixels, such as a 10×10 array. For example, the pixel patch 1904 includes a 10×10 array of pixels. A pixel can include color values, such as a red, a green, and a blue value. For example, a pixel 1906 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 1904 is calculated, and is shown by pixel patch mean 1908. In one illustrative example, the time code can include an "epoch time," which representing the total elapsed time (in fractions of a second) since midnight, Jan. 1, 1970. For example, the pixel patch mean 1908 values are assembled with a time code 1912. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 1910 is one example of a reference video data point.

Figure 20:
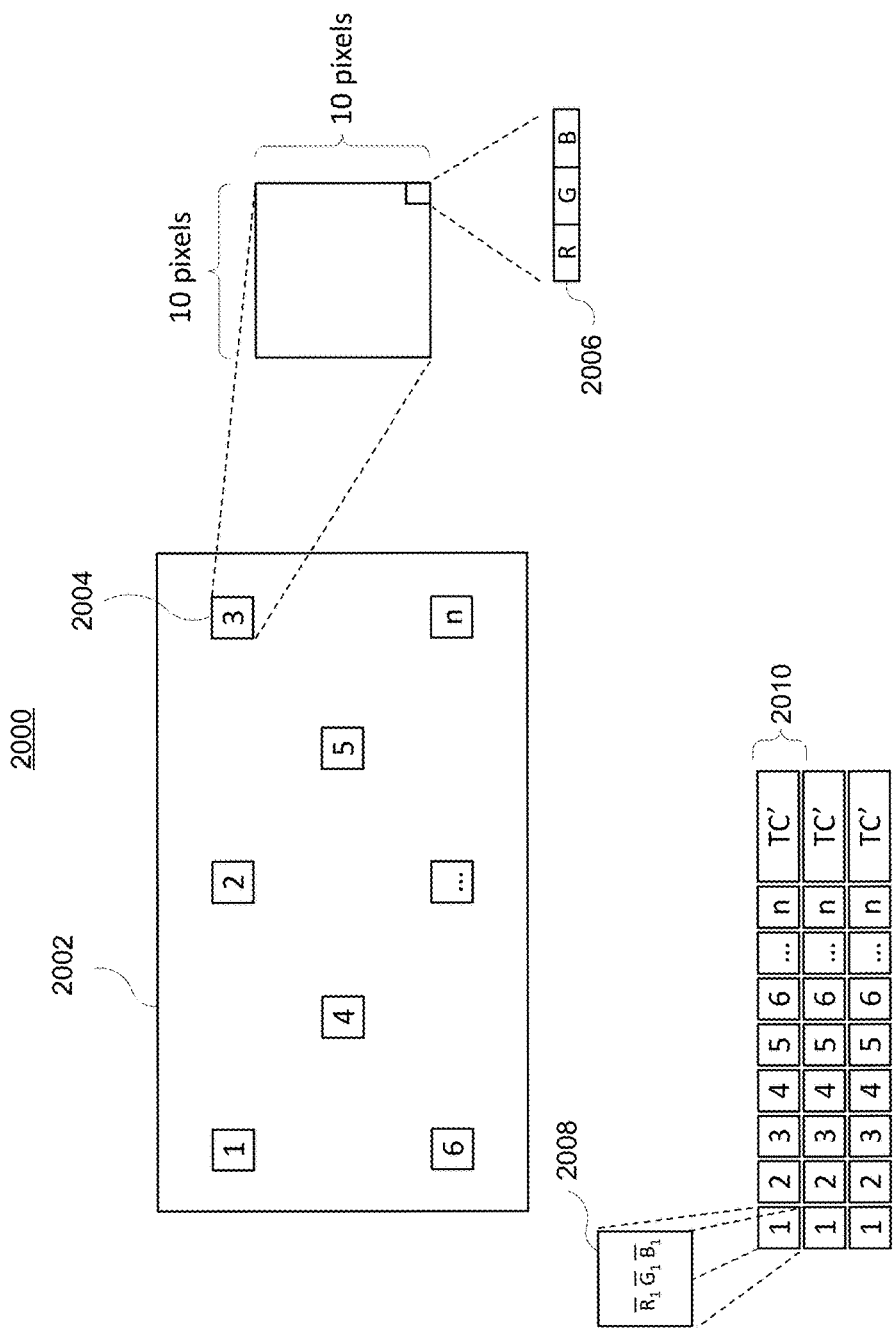
FIG. 20 is a block diagram of an example of a system for collecting video content presented by a display.

A process of identifying unknown video segments begins with steps similar to creating the reference database. For example, FIG. 20 shows a video capture system 2000 including a memory buffer 2002 of a decoder. The video capture system 2000 can be part of the client device 1802 (e.g., a television system) that processes television data presented by a display (e.g., on an Internet-connected television monitor, such as a smart TV, a mobile device, or other television viewing device). The video capture system 2000 can utilize a similar process to generate unknown video data point 2010 as that used by system 1900 for creating reference video data point 1910. In one example, the TV client 1806 can transmit the unknown video data point 2010 to the video matching server 1804 to be identified by the matching server 1804.

As shown in FIG. 20, a video patch 2004 can include a 10×10 array of pixels. The video patch 2004 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 2010) is formed from the mean pixel values and the current time is appended to the data. One or more unknown video data points can be sent to the video matching server 1804 to be matched with data from the reference database 1816 using the vector projection techniques described above.

The skilled person will know that a reference database 1816 storing actual reference data point bit values creates such a large search space that would require extensive computing resources to search and match data. The vector projection techniques described herein offer a significantly more efficient means to search large databases without the need to actually store large values representing the reference data points (also known as reference data cues).

Figure 21:
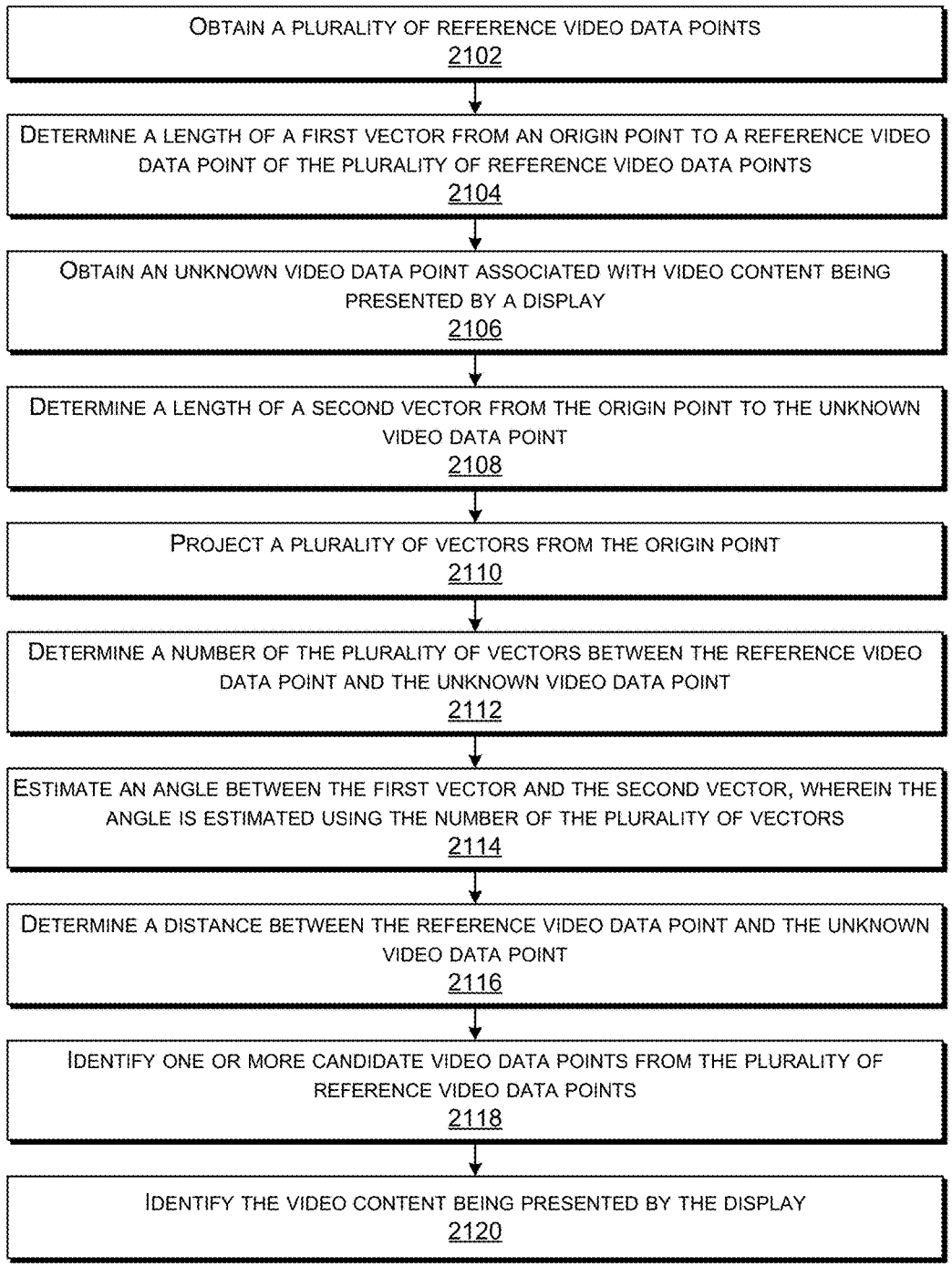
FIG. 21 is a flowchart illustrating another embodiment of a process of identifying video content being displayed and providing related content.

FIG. 21 illustrates an embodiment of a process 2100 for identifying video content (e.g., video content being displayed by a display). In some aspects, the process 2100 may be performed by a computing device, such as the video matching server 1804.

Process 2100 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 2102, the process 2100 includes obtaining a plurality of reference video data points. In some embodiments, the plurality of reference video data points include video data extracted from one or more video frames. The reference video data points can include the data point 1910 shown in FIG. 19, including mean pixel values of pixel patches, a time code, and metadata. In some embodiments, a reference video data point may not include metadata and/or a time code. In some embodiments, the pixel data can be for each pixel of a frame, instead of a pixel patch.

At 2104, the process 2100 includes determining a length of a first vector from an origin point to a reference video data point of the plurality of reference video data points. The origin can include the origin O and the first vector can include the reference data point vector 402 shown in FIG. 3-FIG. 5. The length can be determined any suitable technique, such as by calculating a dot product of the first vector with itself.

At 2106, the process 2100 includes obtaining an unknown video data point associated with video content being presented by a display. The unknown video data point can include the data point 2010 shown in FIG. 20, including mean pixel values of pixel patches and the current time (called a time code) associated with the video frame. In some embodiments, an unknown video data point may not include a time code. In some embodiments, the pixel data can be for each pixel of a frame, instead of a pixel patch.

At 2108, the process 2100 includes determining a length of a second vector from the origin point to the unknown video data point. The origin can include the origin O and the second vector can include the unknown data point vector 404 shown in FIG. 3-FIG. 5. The length can be determined any suitable technique, such as by calculating a dot product of the second vector with itself.

At 2110, the process 2100 includes projecting a plurality of vectors from the origin point. In one example, the plurality of projected vectors can include the projected vectors shown in FIG. 7-FIG. 10. The vectors can be randomly generated or can be pseudo-randomly generated, as discussed with respect to FIG. 13-FIG. 16.

At 2112, the process 2100 includes determining a number of the plurality of vectors between the reference video data point and the unknown video data point. In some embodiments, determining the number of the plurality of vectors between the reference video data point and the unknown video data point includes determining whether each vector of the plurality of vectors is to an algebraic right or to an algebraic left of the first vector of the reference video data point. The determination of whether a projected vector of the plurality of vectors is to an algebraic right or to an algebraic left of the first vector can include performing a dot product on the projected vector and the first vector. Determining the number of the plurality of vectors between the reference video data point and the unknown video data point further includes determining whether each vector of the plurality of vectors is to the algebraic right or to the algebraic left of the second vector of the unknown video data point. A dot product can also be used. Determining the number of the plurality of vectors between the reference video data point and the unknown video data point further includes determining the number of the plurality of vectors between the reference video data point and the unknown video data point. The number of the plurality of vectors includes vectors to the algebraic left of the first vector and to the algebraic right of the second vector or vectors to the algebraic right of the first vector and to the algebraic left of the second vector. One example is shown in FIG. 9 as vectors having stored A1 values 902 and B0 values 904.

In some examples, the process 2100 further includes storing a first binary value for each vector that is determined to be to the algebraic right of the first vector of the reference video data point, and storing a second binary value for each vector that is determined to be to the algebraic left of the first vector of the reference video data point. In one example, the first binary value can be a 0 and the second binary value can be a 1. In another example, the first binary value can be a 1 and the second binary value can be a 0.

In some examples, the process 2100 further includes storing a first binary value for each vector that is determined to be to the algebraic right of the second vector of the unknown video data point, and storing a second binary value for each vector that is determined to be to the algebraic left of the second vector of the unknown video data point. In one example, the first binary value can be a 0 and the second binary value can be a 1. In another example, the first binary value can be a 1 and the second binary value can be a 0.

In some examples, the reference video data point is discarded after the length of the first vector of the reference video data point is determined and after each vector of the plurality of vectors is determined to be to the algebraic right or to the algebraic left of the first vector. For example, the bits representing the reference video data point can be removed from memory. Discarding the reference video data point allows much less information to be stored by a matching system.

At 2114, the process 2100 includes estimating an angle between the first vector and the second vector. The angle is estimated using the number of the plurality of vectors. For example, estimating the angle between the first vector of the reference video data point and the second vector of the unknown video data point includes multiplying a constant by a ratio. The ratio includes the number of the plurality of vectors between the reference video data point and the unknown video data point divided by a total number of the plurality of vectors. The constant can include a pre-determined value (e.g., 180, 360, or other suitable number).

At 2116, the process 2100 includes determining a distance between the reference video data point and the unknown video data point. The distance is determined using the estimated angle and the determined lengths of the first vector and the second vector. For example, determining the distance between the reference video data point and the unknown video data point includes performing a Pythagorean identity calculation using the estimated angle and the determined lengths of the first vector and the second vector.

At 2118, the process 2100 includes identifying one or more candidate video data points from the plurality of reference video data points. A candidate video data point is a candidate for matching the unknown video data point. The one or more candidate video data points are determined based on determined distances between one or more reference video data points and the unknown video data point. For example, a nearest neighbor algorithm can be used to determine candidates based on the distances.

At 2120, the process 2100 includes identifying the video content being presented by the display. The video content being presented by the display is identified by comparing the unknown video data point with the one or more candidate video data points. For example, identifying the video content being presented by the display includes determining a match between the unknown video data point and a candidate video data point. The match is an approximate match based on the candidate video data point being a closest video data point of the one or more candidate video data points to the unknown video data point. In some examples, a path pursuit algorithm can be used to identify the video content being presented.

The nearest neighbor and path pursuit techniques mentioned previously are now described in detail. An example of tracking video transmission using ambiguous cues is given, but the general concept can be applied to any field, such as those described above.

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the data base is processed. Visual cues (a handful of pixel values) are taken from frames every constant fraction of a second and put in specialized data structure (Note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green and blue (RGB) make of that pixel's color. In the terminology of this manuscript, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second the wires are all tangled together. These statements are made exact in section 2. The algorithm described below does this in two conceptual steps. When a cue is received, it looks for all points on all the known paths who are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations who are sufficiently unlikely. This history update process ensures that on the one hand only a small history is kept but on the other hand no probable locations are ever deleted. The generic algorithm is given in Algorithm 1 and illustrated in FIG. 22.

| | Algorithm 1 Generic path pursuit algorithm. |
|---|---|
| 1: | Set of suspects is empty |
| 2: | loop |
| 3: | Receive latest cue. |
| 4: | Find path points who are close to it. |
| 5: | Add them to the set of suspects. |
| 6: | Based on the suspects update the location likelihood function. |
| 7: | Remove from suspect set those who do not contribute to the likelihood function. |
| 8: | if A location is significantly likely then |
| 9: | Output the likely location. |
| 10: | end if |
| 11: | end loop |

The document begins with describing the Probabilistic Point Location in Equal Balls (PPLEB) algorithm in Section 1. It is used in order to perform line 5 in Algorithm 1 efficiently. The ability to perform this search for suspects quickly is crucial for the applicability of this method. Later, in section 2 one possible statistical model is described for performing lines 6 and 7. The described model is a natural choice for the setup. It is also shown how it can be used very efficiently.

Section 1—Probabilistic Point Location in Equal Balls

The following section describes a simple algorithm for performing probabilistic point location in equal balls (PPLEB). In the traditional PLEB (point location in equal balls), one starts with a set of n points $x_i$ in $\mathbb{R}^d$ and a specified ball of radius r. The algorithm is given O(poly(n)) preprocessing time to produce an efficient data structure. Then, given a query point x the algorithm is required to return all points $x_i$ such that $\|x-x_i\| \le r$. The set of points such that $\|x-x_i\| \le r$ geometrically lie within a ball of radius r surrounding the query x (see FIG. 23). This relation is referred to as $x_i$ being close to x or as $x_i$ and x being neighbors.

The problem of PPLEB and the problem of nearest neighbor search are two similar problems that received much attention in the academic community. In fact, these problems were among the first studied in the field of computational geometry. Many different methods cater to the case where the ambient dimension d is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1 Locality Sensitive Hashing

In the scheme of local sensitive hashing, one devises a family of hash functions H such that:

$$\Pr_{u \sim U}(u(x) \ne u(y) \mid \|x-y\| \le r) \equiv p$$

$$\Pr_{u \sim U}(u(x) \ne u(y) \mid \|x-y\| \ge 2r) \ge 2p$$

In words, the probability of x and y being mapped to the same value by h is significantly higher if they are close to each other.

For the sake of clarity, let us first deal with a simplified scenario where all incoming vectors are of the same length r' and r'>$\sqrt{2}$r. The reason for the latter condition will become clear later. First a random function u ∈ U is defined, which separates between x and y according to the angle between them. Let u be a random vector chosen uniformly from the unit sphere $S^{d-1}$ and let u(x)=sign($\vec{u} \cdot x$) (See FIG. 24). It is easy to verify that $\Pr_{u \sim U}(u(x) \ne u(y)) = 0_{x,y}/\pi$. Moreover, for any points x, y, x', y' on a circle such that $\|x'-y'\| \le 2\|x-y\|$, $0_{x',y'} \le 20_{x,y}$ is achieved. Defining p, the following equations are used:

$$\Pr_{u \sim U}(u(x) \ne u(y) \mid \|x-y\| \le r) \equiv p$$

$$\Pr_{u \sim U}(u(x) \ne u(y) \mid \|x-y\| \ge 2r) \ge 2p$$

The family of functions H is set to be a cross product of t independent copies of u, i.e. h(x)=[u1(x), ..., $u_t(x)$]. Intuitively, one would like to have that if h(x)=h(y) then x and y are likely to be close to each other. Let us quantify that. First, compute the expected number of false positive mistakes $n_{fp}$. These are the cases for which h(x)=h(y) but $\|x-y\|>2r$. A value t is found for which $n_{fp}$ is no more than 1, i.e. one is not expected to be wrong.

$$E[n_{fp}] \le n(1-2p)^t \le 1 \rightarrow t \ge \log(1/n)/\log(1-2p)$$

Now, the probability that h(x)=h(y) given that they are neighbors is computed:

$$Pr(h(x) = h(y) \mid \|x-y\| \le r) \ge (1-p)^{\log(1/n)/\log(1-2p)}$$

$$= (1/n)^{\log(1-p)/\log(1-2p)} \ge 1/\sqrt{n}.$$

Note here that one must have that 2p<1 which requires r'>$\sqrt{2}$r. This might not sound like a very high success probability. Indeed, $1/\sqrt{n}$ is significantly smaller than ½. The next section will describe how to boost this probability up to ½.

Section 1.2 The Point Search Algorithm

Each function h maps every point in space to a bucket. Define the bucket function $B_h: \mathbb{R}^d \to 2^{[n]}$ of a point x with respect to hash function has $B_h(x) \equiv \{x_i \mid h(x_i)=h(x)\}$. The data structure maintained is m=O($\sqrt{n}$) instances of bucket functions [$Bh_1, \ldots, Bh_m$]. When one searches for a point x, the function returns $B(x) = \cup_i B_{h_j}(x)$. According to the previous section, there are two desired results:

$$\Pr(x_i \in B(x) \mid \|x_i-x\| \le r) \ge \frac{1}{2}$$

$$E[\mid B(x) \cap \{x_i \mid \|x-x_i\|>2r\}\mid] \le \sqrt{n}.$$

In other words, while with probability at least ½ each neighbor of x is found, one is not likely to find many non-neighbors.

Section 1.3 Dealing with Different Radii Input Vectors

Figure 25:
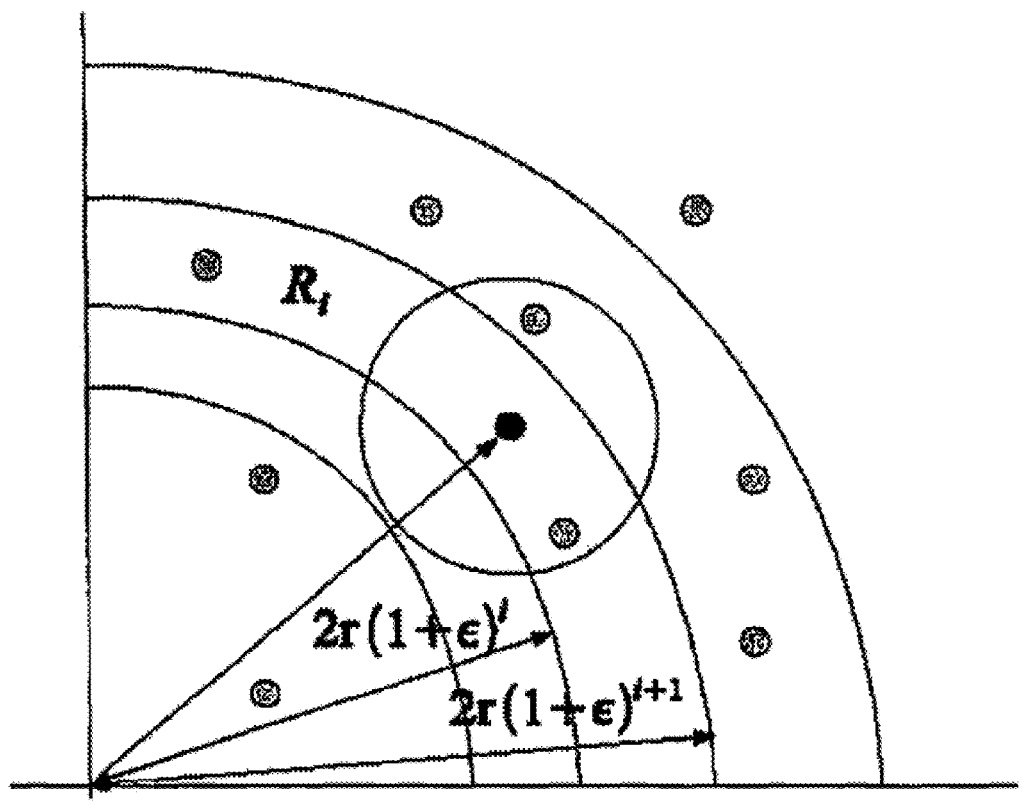
FIG. 25 is a chart illustrating a space divided into rings of exponentially growing width.

The previous sections only dealt with searching through vectors of the same length, namely r'. Now described is how one can use the construction as a building block to support a search in different radii. As seen in FIG. 25, the space is divided into rings of exponentially growing width. Ring i, denoted by $R_i$, includes all points $x_i$ such that $\|x_i\| \in [2r(1+\in)^i, 2r(1+\in)^{i+1}]$. Doing this achieves two ends. First, if $x_i$ and $x_j$ belong to the same ring, then $\|x_j\|/(1+\in) \le \|x_i\| \le \|x_j\|(1+\in)$. Second, any search can be performed in at most $1/\in$ such rings. Moreover, if the maximal length vector in the data set is r' then the total number of rings in the system is O(log (r'/r)).

Section 2 The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: The particle only follows the path approximately; The path can be discontinuous and intersect itself many times; Both particle and path positions are given in a sequence of time points (different for each).

It is important to note that this problem can simulate tracking a particle on any number of paths. This is simply done by concatenating the paths into one long path and interpreting the resulting position as the position on the individual paths.

Figure 26:
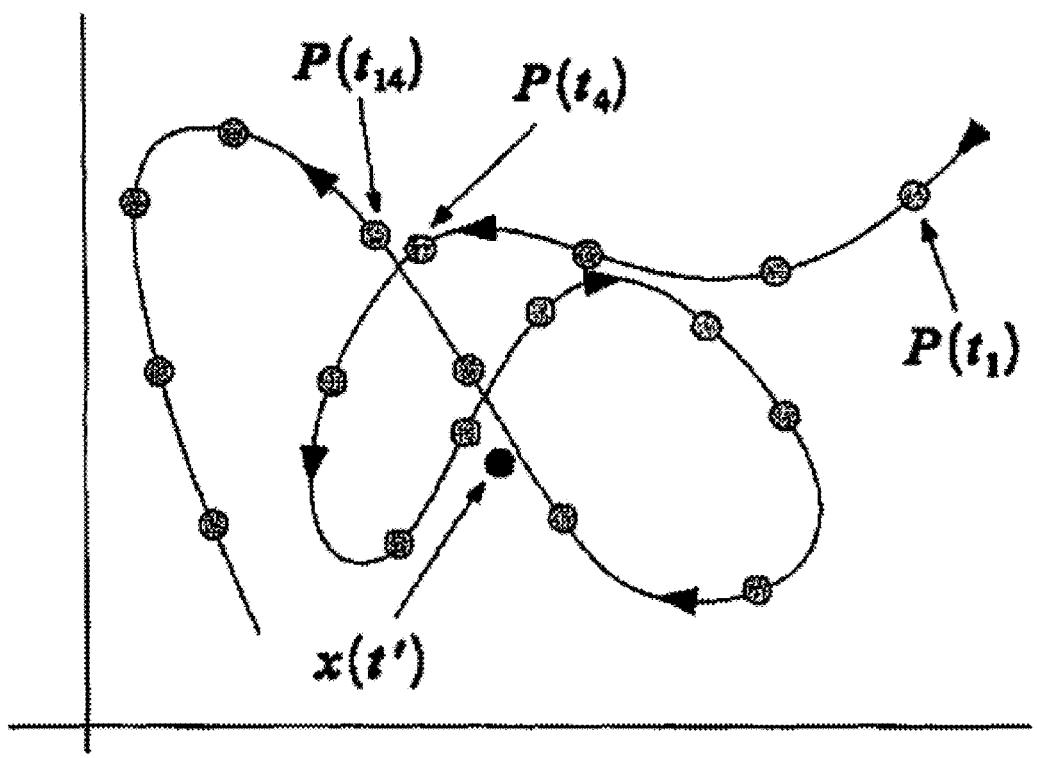
FIG. 26 is a chart illustrating self-intersecting paths and a query point.

More precisely, let path P be parametric curve P: $\mathbb{R} \to \mathbb{R}^d$. The curve parameter will be referred to as the time. The points on the path that are known to us are given in arbitrary time points i.e. n pairs $(t_i, P(t_i))$ are given. The particle follows the path but its positions are given in different time points, as shown in FIG. 26. Further, m pairs $(t'_j, x(t'_j))$ are given, where $x(t'_j)$ is the position of the particle in time $t'_j$.

Section 2.1 Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, τ seconds ago it should have been in offset t−τ. Thus x(t'−τ) should be close to P(t−τ) (note that if the particle is intersecting the path, and x(t') is close to P(t) temporarily, it is unlikely that x(t'−τ) and P(t−τ) will also be close). Define the relative offset as Δ=t−t'. Notice that as long as the particle is following the path the relative offset Δ remains unchanged. Namely, x(t') is close to P(t'+Δ).

The maximum likelihood relative offset is obtained by calculating:

$$\Delta = \underset{\delta}{\text{argmax}}\ Pr(x(t'_m), x(t'_{m-1}), \ldots, x(t'_1) | P, \delta)$$

In words, the most likely relative offset is the one for which the history of the particle is most likely. This equation however cannot be solved without a statistical model. This model must quantify: How tightly x follows the path; How likely it is that x "jumps" between locations; How smooth the path and particle curves are between the measured points.

Section 2.2 Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1, set the likelihood function to be proportional to $f$ which is defined as follows:

$$f_m(\lfloor \delta/\tau \rfloor) = \sum_{j=1}^{m} \sum_{i=1}^{n} e^{-\left(\frac{\|x(t'_j)-P(t_i+\delta)\|}{\alpha r}\right)^2} (1-\zeta)^{t'_i-t'_j}.$$

Here α<<1 is a scale coefficient and ζ>0 is the probability that the particle will jump to a random location on the path in a given time unit.

Updating the function $f$ efficiently can be achieved using the following simple observation.

$$f_m(\lfloor \delta/\tau \rfloor) = \sum_{i=1}^{n} e^{-\left(\frac{\|x(t'_m)-P(t_i+\delta)\|}{\alpha r}\right)^2} + f_{m-1}(\lfloor \delta/\tau \rfloor)(1-\zeta)^{t'_m-t'_{m-1}}$$

Moreover, since α<<1, if $\|x(t'_m)-P(t_i)\| \geq r$, the follow occurs:

$$e^{-\left(\frac{\|x(t'_m)-P(t_i)\|}{\alpha r}\right)^2} \approx 0.$$

This is an important property of the likelihood function since the sum update can now performed only over the neighbors of $x(t'_j)$ and not the entire path. Denote by S the set of $(t_i, P(t_i))$ such that $\|x(t'_m)-P(t_i)\| \leq r$. The follow equation occurs:

$$f_m(\lfloor \delta/\tau \rfloor) = \sum_{(t_i, P(t_i)) \in S \wedge \lfloor (t'_m-t'_i)/\tau \rfloor = \lfloor \delta/\tau \rfloor} e^{-\left(\frac{\|x(t'_m)-P(t_i)\|}{\alpha r}\right)^2} + f_{m-1}(\delta)(1-\zeta)^{t'_m-t'_{m-1}}$$

This is described in Algorithm 2.2 below. The term $f$ is used as a sparse vector that receives also negative integer indices. The set S is the set of all neighbors of $x(t_i)$ on the path and can be computed quickly using the PPLEB algorithm. It is easy to verify that if the number of neighbors of $x(t_i)$ is bounded by some constant $n_{near}$ then the number of non-zeros in the vector $f$ is bounded by $n_{near}/\zeta$ which is only a constant factor larger. The final stage of the algorithm is to output a specific value of δ if $f(\lfloor \delta/\tau \rfloor)$ is above some threshold value.

Algorithm 2 Efficient likelihood update.

```
1: f ← 0
2: while (t_j', x(t_j')) ∈ INPUT do
3:    f ← (1 − ζ)^(t'_j−t'_{j-1}) f
4:    S ← {(t_i, P(t_i)) | ||x(t_j') − P(t_i))|| ≤ r}
5:    for (t_i, P(t_i)) ∈ S do
6:        δ ← t_j' − t_i
```

Algorithm 2 Efficient likelihood update.

7:
$$f(\lfloor \delta/\tau \rfloor) \leftarrow f(\lfloor \delta/\tau \rfloor) + e^{-\left(\frac{\|x(t_i) - P(t')\|}{\sigma_r}\right)^2}$$

Figure 22:
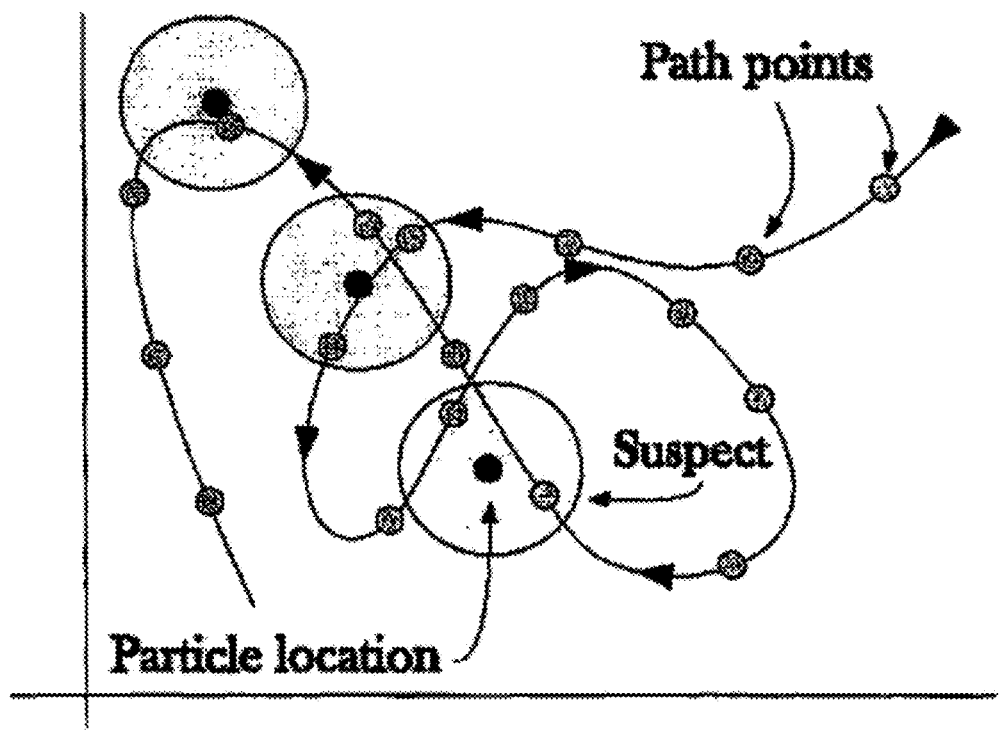
FIG. 22 is a chart illustrating point locations and the path points around them.

8:    end for
9:    Set all f values below threshold $\epsilon$ to zero.
10: end while FIG. 22 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

Figure 23:
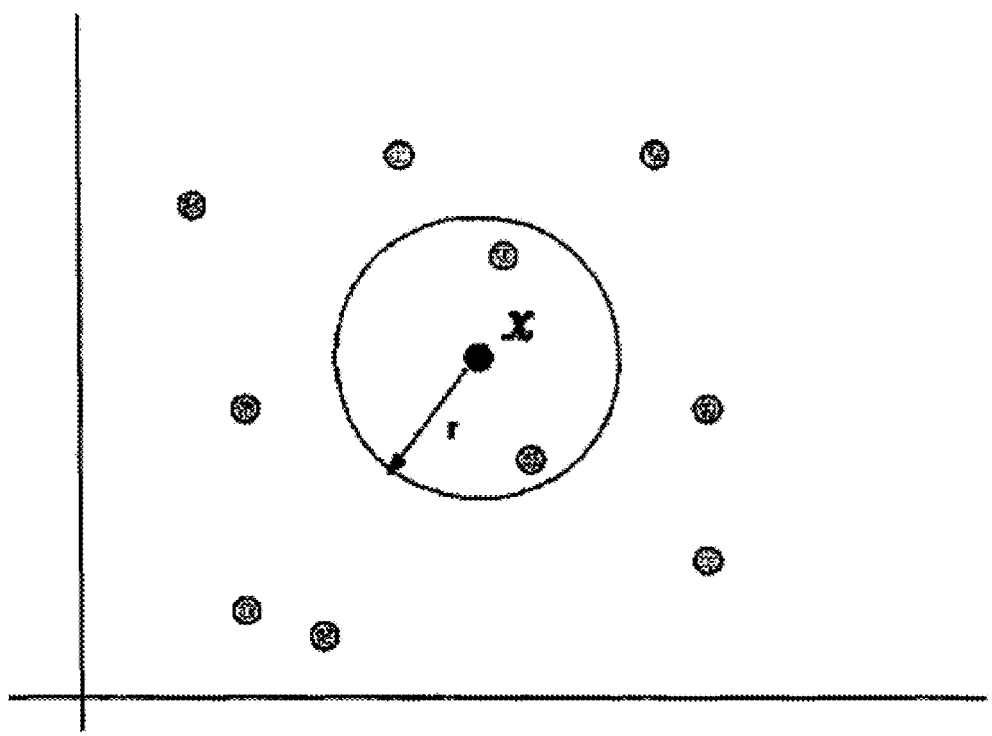
FIG. 23 is a chart illustrating a set of points who lie within distance from a query point.

In FIG. 23, given a set of n (grey) points, the algorithm is given a query point (black) and returns the set of points who lie within distance r from it (the points inside the circle). In the traditional setting, the algorithm must return all such points. In the probabilistic setting each such point should be returned only with some constant probability.

Figure 24:
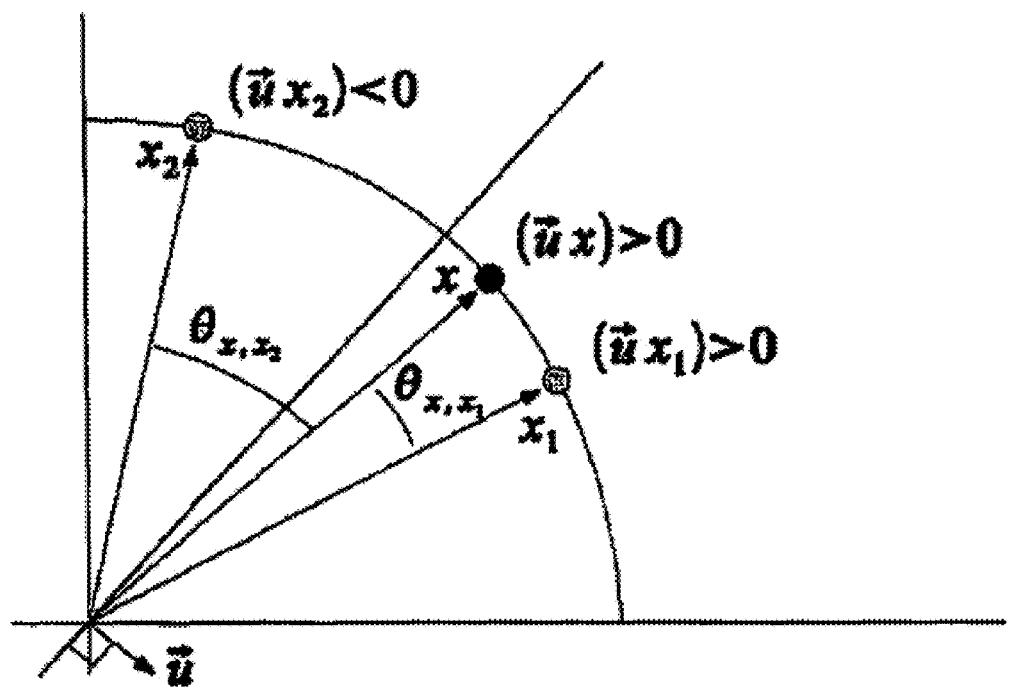
FIG. 24 is a chart illustrating possible point values.

FIG. 24 illustrates the values of $u(x_1)$, $u(x_2)$, and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

FIG. 25 shows that by dividing the space into rings such that ring $R_i$ is between radius $2r(1+\epsilon)^i$ and $2r(1+\epsilon)^{i+1}$, it can be made sure that any two vectors within a ring are the same length up to $(1+\epsilon)$ factors and that any search is performed in at most $1/\epsilon$ rings.

FIG. 26 shows a self-intersecting paths and a query point (in black). It illustrates that without the history of the particle positions it is impossible to know where it is on the path.

Figure 27:
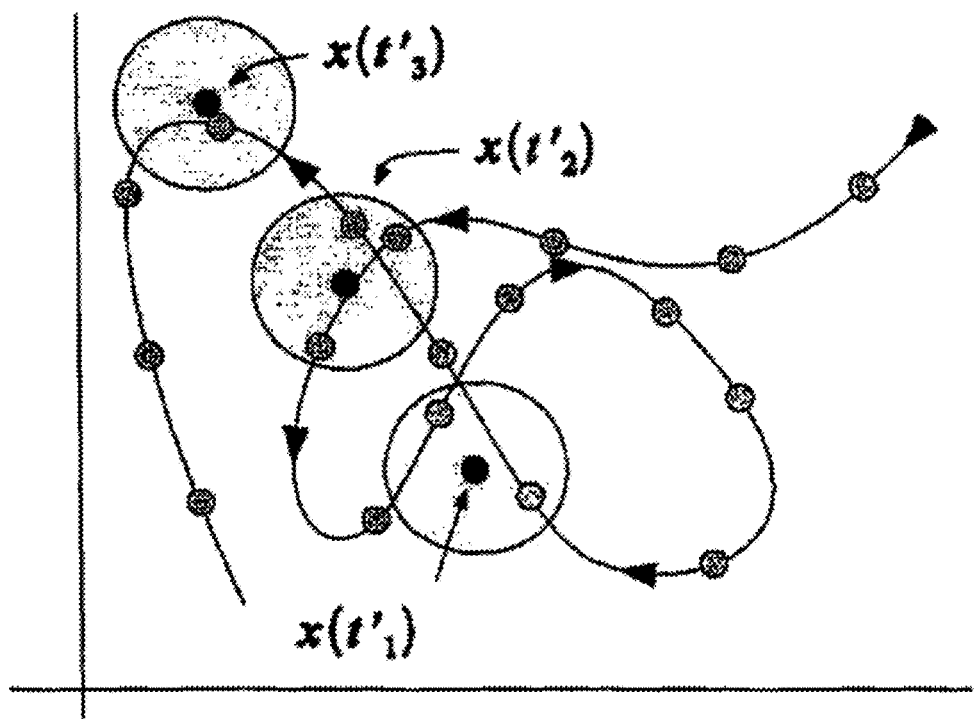
FIG. 27 is a chart illustrating three consecutive point locations and the path points around them.

FIG. 27 gives three consecutive point locations and the path points around them. Note that neither $x(t_1)$ nor $x(t_2)$ alone would have been sufficient to identify the correct part of the path. Together however they are. Adding $x(t_3)$ increases the certainty that the particle is indeed of the final (left) curve of the path.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
obtaining a reference data point;
determining first representative data associated with the reference data point, the first representative data indicating a relationship between a vector associated with the reference data point and a plurality of projected vectors;
removing a number of bits associated with the reference data point from storage in response to determining the first representative data;
obtaining an unknown data point;
determining second representative data associated with the unknown data point, the second representative data indicating a relationship between a vector associated with the unknown data point and the plurality of projected vectors; and
identifying, using the first representative data and the second representative data, one or more candidate data points for matching the unknown data point, wherein identifying the one or more candidate data points includes comparing the unknown data point to the reference data point.

2. The method of claim 1, wherein the number of bits associated with the reference data point is removed prior to identifying one or more candidate data points for matching the unknown data point.

3. The method of claim 1, wherein the first representative data includes a length of the vector associated with the reference data point.

4. The method of claim 1, wherein the first representative data includes information indicating whether a projected vector is to an algebraic left or an algebraic right of the vector associated with the reference data point.

5. The method of claim 4, wherein the first representative data includes a length of the vector associated with the reference data point.

6. The method of claim 1, further comprising storing the first representative data.

7. The method of claim 1, wherein the second representative data includes a length of the vector associated with the unknown data point.

8. The method of claim 1, wherein the second representative data includes information indicating whether a projected vector is to an algebraic left or an algebraic right of the vector associated with the unknown data point.

9. The method of claim 8, wherein the second representative data includes a length of the vector associated with the unknown data point.

10. The method of claim 1, further comprising:
determining, using the first representative data and the second representative data, third representative data, the third representative data indicating a relationship between the vector associated with the reference data point and the vector associated with the unknown data point; and
identifying the reference data point as a candidate data point based on the third representative data.

11. The method of claim 10, wherein the third representative data includes an angle between the vector associated with the reference data point and the vector associated with the unknown data point.

12. The method of claim 10, wherein the third representative data includes an angle between the vector associated with the reference data point and the vector associated with the unknown data point, and wherein the angle is estimated based on a number of the plurality of projected vectors between the vector associated with the reference data point and the vector associated with the unknown data point.

13. The method of claim 10, wherein the third representative data includes a distance between the reference data point and the unknown data point.

14. The method of claim 10, wherein the third representative data includes:
an angle between the vector associated with the reference data point and the vector associated with the unknown data point; and
a distance between the reference data point and the unknown data point, wherein the distance is determined using the angle, a length of the vector associated with the reference data point, and a length of the vector associated with the unknown data point, and wherein the reference data point is identified as the candidate data point based on the distance.

15. The method of claim 1, wherein the unknown data point is associated with content being presented by a display.

16. The method of claim 1, further comprising identifying video content being presented by a display, wherein identifying the video content includes comparing the unknown data point with the one or more candidate data points.

17. The method of claim 1, wherein the reference data point includes pixel data, and wherein removing the number of bits associated with the reference data point includes removing some or all of the pixel data from the storage.

18. A system comprising:
one or more processors;
one or more non-transitory machine-readable storage media containing instructions which when executed on the one or more processors, cause the one or more processors to perform operations including:
obtaining a reference data point;
determining first representative data associated with the reference data point, the first representative data indicating a relationship between a vector associated with the reference data point and a plurality of projected vectors;
removing a number of bits associated with the reference data point from storage in response to determining the first representative data;
obtaining an unknown data point;
determining second representative data associated with the unknown data point, the second representative data indicating a relationship between a vector associated with the unknown data point and the plurality of projected vectors; and
identifying, using the first representative data and the second representative data, one or more candidate data points for matching the unknown data point, wherein identifying the one or more candidate data points includes comparing the unknown data point to the reference data point.

19. The system of claim 18, wherein the number of bits associated with the reference data point is removed prior to identifying one or more candidate data points for matching the unknown data point.

20. The system of claim 18, further comprising instructions, which when executed on the one or more processors, cause the one or more processors to perform operations including:
determining, using the first representative data and the second representative data, third representative data, the third representative data indicating a relationship between the vector associated with the reference data point and the vector associated with the unknown data point; and
identifying the reference data point as a candidate data point based on the third representative data.

* * * * *